(12) United States Patent
Palin et al.

(10) Patent No.: US 8,929,817 B2
(45) Date of Patent: *Jan. 6, 2015

(54) SENSOR-BASED TOUCH INQUIRY CONTROL

(75) Inventors: Arto Palin, Viiala (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 48 days.

This patent is subject to a terminal disclaimer.

(21) Appl. No.: 13/223,617

(22) Filed: Sep. 1, 2011

(65) Prior Publication Data

US 2012/0289160 A1    Nov. 15, 2012

Related U.S. Application Data

(63) Continuation-in-part of application No. 13/107,145, filed on May 13, 2011.

(51) Int. Cl.
| H04B 7/00 | (2006.01) |
| H04B 17/02 | (2006.01) |
| H04B 1/18 | (2006.01) |
| H04W 48/14 | (2009.01) |

(52) U.S. Cl.
CPC .................................. *H04W 48/14* (2013.01)
USPC ........................ 455/41.2; 455/134; 455/161.3

(58) Field of Classification Search
USPC ............ 455/41.1–41.3, 451, 552.1, 509, 557, 455/41.2, 67.11, 134, 161.3, 436; 370/254, 370/338
See application file for complete search history.

(56) References Cited

U.S. PATENT DOCUMENTS

| 5,530,702 | A | 6/1996 | Palmer et al. |
| 6,816,063 | B2 | 11/2004 | Kubler et al. |
| 6,892,052 | B2 | 5/2005 | Kotola et al. |
| 7,075,412 | B1 | 7/2006 | Reynolds et al. |
| 7,151,764 | B1 | 12/2006 | Heinonen et al. |
| 7,519,682 | B2 | 4/2009 | Smith et al. |
| 7,775,432 | B2 | 8/2010 | Jalkanen et al. |
| 8,210,433 | B2 | 7/2012 | Jalkanen et al. |
| 2001/0045460 | A1 | 11/2001 | Reynolds et al. |

(Continued)

FOREIGN PATENT DOCUMENTS

| DE | 102010019328 | 12/2010 |
| EP | 2073514 | 6/2009 |

(Continued)

OTHER PUBLICATIONS nokia-symbian3-developers-librar.*

(Continued)

*Primary Examiner* — Andrew Wendell
*Assistant Examiner* — Cindy Trandai
(74) *Attorney, Agent, or Firm* — Locke Lord LLP

(57) ABSTRACT

A system for selectively expediting connection establishment between apparatuses. In accordance with at least one embodiment of the present invention, an apparatus may sense a first change in the disposition of the apparatus, and may initiate device discovery based on the first sensed change. A determination may then be made in the apparatus as to whether another apparatus encountered by the apparatus during device discovery satisfies a predetermined response criteria. The apparatus may then select the other apparatus if it is determined that the other apparatus satisfies the predetermined response criteria.

33 Claims, 21 Drawing Sheets

(56) References Cited

U.S. PATENT DOCUMENTS

| | | | |
|---|---|---|---|
| 2002/0021809 A1 | 2/2002 | Salo et al. | |
| 2002/0022961 A1 | 2/2002 | Sepanaho | |
| 2002/0023264 A1 | 2/2002 | Aaltonen et al. | |
| 2002/0069406 A1 | 6/2002 | Aaltonen et al. | |
| 2002/0071436 A1 | 6/2002 | Border et al. | |
| 2002/0087997 A1 | 7/2002 | Dahlstrom | |
| 2002/0191998 A1 | 12/2002 | Cremon et al. | |
| 2003/0043041 A1 | 3/2003 | Zeps et al. | |
| 2003/0084177 A1 | 5/2003 | Mulligan | |
| 2003/0097304 A1 | 5/2003 | Hunt | |
| 2003/0120745 A1 | 6/2003 | Katagishi et al. | |
| 2003/0134653 A1 | 7/2003 | Sarkkinen et al. | |
| 2003/0220765 A1 | 11/2003 | Overy et al. | |
| 2004/0081117 A1* | 4/2004 | Malek et al. | 370/324 |
| 2004/0193676 A1 | 9/2004 | Marks | |
| 2004/0203414 A1 | 10/2004 | Harumoto | |
| 2004/0225199 A1 | 11/2004 | Evanyk et al. | |
| 2005/0054290 A1 | 3/2005 | Logan et al. | |
| 2005/0073522 A1 | 4/2005 | Aholainen et al. | |
| 2007/0047505 A1 | 3/2007 | Wassingbo | |
| 2007/0141984 A1 | 6/2007 | Kuehnel et al. | |
| 2007/0275746 A1 | 11/2007 | Bitran | |
| 2007/0291710 A1* | 12/2007 | Fadell | 370/338 |
| 2008/0004021 A1 | 1/2008 | Sanjay | |
| 2008/0055632 A1 | 3/2008 | Oshiumi et al. | |
| 2008/0090606 A1 | 4/2008 | Hwang et al. | |
| 2008/0146151 A1 | 6/2008 | Lyu et al. | |
| 2008/0242220 A1* | 10/2008 | Wilson et al. | 455/3.04 |
| 2008/0311957 A1* | 12/2008 | Jantunen et al. | 455/560 |
| 2009/0161582 A1* | 6/2009 | Kammer et al. | 370/254 |
| 2009/0163198 A1* | 6/2009 | Ray et al. | 455/425 |
| 2009/0180519 A1* | 7/2009 | Lee et al. | 375/130 |
| 2009/0215397 A1 | 8/2009 | Thorn et al. | |
| 2009/0276439 A1 | 11/2009 | Rosenblatt et al. | |
| 2010/0082784 A1* | 4/2010 | Rosenblatt et al. | 709/222 |
| 2010/0093280 A1 | 4/2010 | Ahn et al. | |
| 2010/0105328 A1 | 4/2010 | Ahn et al. | |
| 2010/0120364 A1* | 5/2010 | Lee et al. | 455/41.2 |
| 2010/0144274 A1* | 6/2010 | Mcdowall et al. | 455/41.2 |
| 2010/0211698 A1 | 8/2010 | Krishnaswamy | |
| 2010/0241529 A1 | 9/2010 | Kim | |
| 2010/0250135 A1 | 9/2010 | Li et al. | |
| 2010/0268828 A1* | 10/2010 | Pahlavan et al. | 709/227 |
| 2010/0319055 A1* | 12/2010 | Tamura et al. | 726/4 |
| 2011/0140864 A1* | 6/2011 | Bucci | 340/10.42 |
| 2011/0235624 A1 | 9/2011 | Scott et al. | |
| 2012/0015605 A1 | 1/2012 | Sole | |
| 2012/0017257 A1 | 1/2012 | Lee et al. | |
| 2012/0081235 A1* | 4/2012 | Nadeem et al. | 340/933 |
| 2012/0169473 A1 | 7/2012 | Jalkanen et al. | |

FOREIGN PATENT DOCUMENTS

| | | |
|---|---|---|
| EP | 2355563 | 8/2011 |
| EP | 2424281 | 2/2012 |
| WO | WO0051293 | 8/2000 |
| WO | 0067221 | 11/2000 |
| WO | WO 0145319 | 6/2001 |
| WO | WO 0152179 | 7/2001 |
| WO | WO 0211074 | 2/2002 |
| WO | WO2007040398 | 4/2007 |
| WO | WO2009013646 | 1/2009 |

OTHER PUBLICATIONS

Communication from European Patent Office together with enclosed Extended European Search Report for European Patent Application No. 12166717.4-2412—Date of Completion of Search: Jul. 12, 2012, 10 pages.
European Search Report for EP Application No. 08006467.8-2412 / 1965555 dated Nov. 2, 2011.
Widmer, P., "Smart Box Software Framework", Vision Document, Apr. 7, 2003, 23 pages.
International Search Report for International Application No. PCT/FI2012/050431—Date of Completion of Search: Sep. 3, 2012-4 pages.
Written Opinion of the International Searching Authority for International Application No. PCT/FI2012/050431—Date of Completion of Opinion: Sep. 3, 2012-6 pages.
Office Action for Korean Application No. 10-2006-7009441 dated Apr. 23, 2007.
Notice of Allowance for Korean Application No. 10-2006-7009441 dated Jan. 7, 2008.
Radio Frequency Identification RFID—A basic primer; AIM Inc. White Paper; Aug. 23, 2001; 17 pages; 1.2; The association of the Automatic Identification and Data Capture Industry (AIM Inc.); WP-98002R2.
Notice and Filing of Opposition in European Patent 1 685 689.
Reply to Notice of Opposition in European Patent 1 685 689.
International Search Report for International Application No. PCT/FI2012/050442—Date of Completion of Search: Sep. 18, 2012-4 pages.
Written Opinion of the International Searching Authority for International Application No. PCT/FI2012/050442—Date of Completion of Opinion: Sep. 18, 2012-7 pages.
Notice and Filing of Opposition in European Patent 1 685 689, Apr. 24, 2009, 11 pages.
Reply to Notice of Opposition in European Patent 1 685 689, Sep. 28, 2009, 11 pages.
English Language Machine Translation of German Patent Application Publication No. DE 10 2010 019 328—16 pages.
Substantive Examination Adverse Report with Search Report for Malaysian Patent Application No. PI2012002048, Sep. 15, 2014, 4 pages.

* cited by examiner

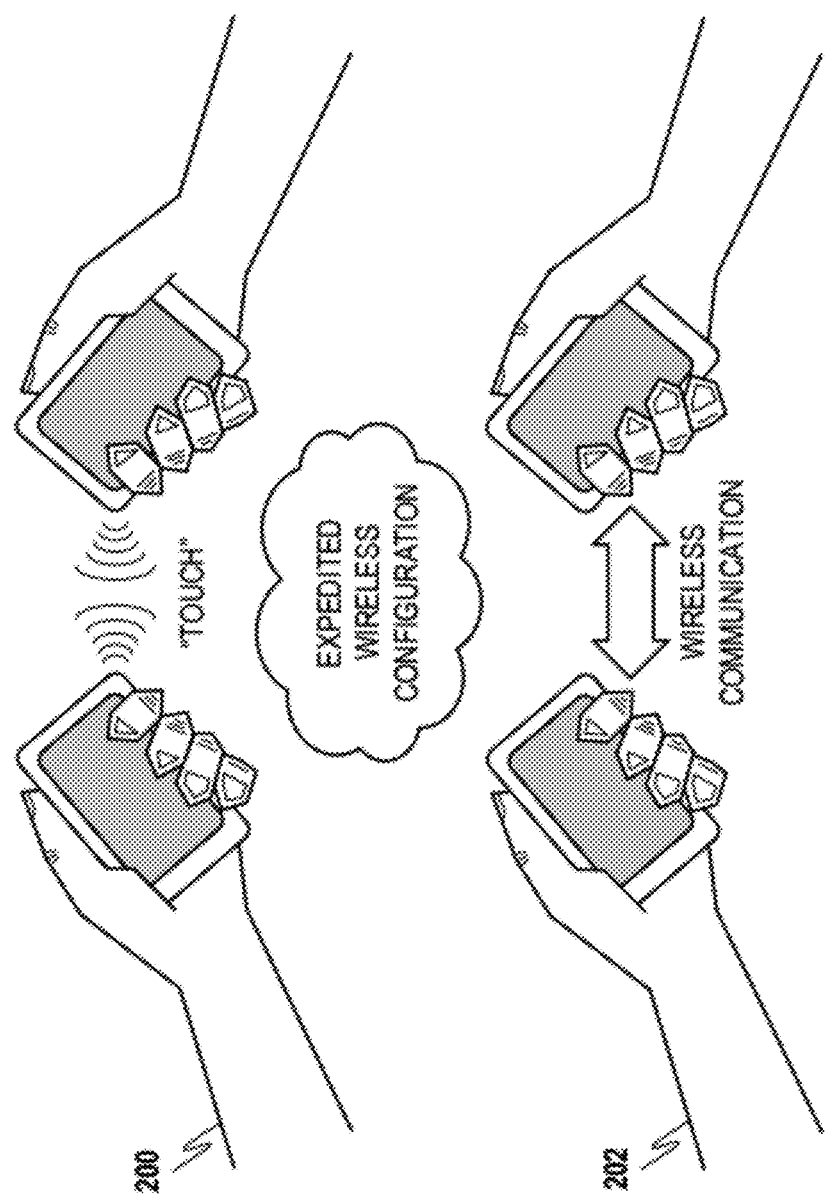

FIG. 10

| Byte | Parameter type | Content |
|---|---|---|
| Byte 0 | Supplier Specific (Debug) Command | 0x00 Value in hex |
| Byte 1 | Supplier Specific (Debug) Command | 0xFC Value in hex |
| Byte 2 | Parameter Total Length | 0x04 |
| Byte 3 | Channel ID | 0xF0 Value in hex |
| Byte 4 | HCI_ext_opcode | Inquiry Result event generation (hex value to be defined) |
| Byte 5 | event mode for Inquiry result with RSSI events | 0x00= vendor default<br>0x01=once per inquiry<br>0x02=each time device is found |
| Byte 6 | event mode for Inquiry result with EIR events | 0x00= vendor default<br>0x01=once per inquiry<br>0x02=each time device is found |

FIG. 11

| Byte | Parameter type | Content |
|---|---|---|
| Byte 0 | Event Code | 0xFF Value in hex |
| Byte 1 | Parameter total length | 0x05 Value in hex |
| Byte 2 | Channel ID | 0xF0 Value in hex |
| Byte 3 | Unused | 0x03 |
| Byte 4 | HCI_ext_eventcode | Inquiry Result event generation (hex value to be defined) |
| Byte 5 | set event mode for Inquiry result with RSSI events | 0x00= vendor default<br>0x01=once per inquiry<br>0x02=each time device is found |
| Byte 6 | set event mode for Inquiry result with EIR events | 0x00= vendor default<br>0x01=once per inquiry<br>0x02=each time device is found |

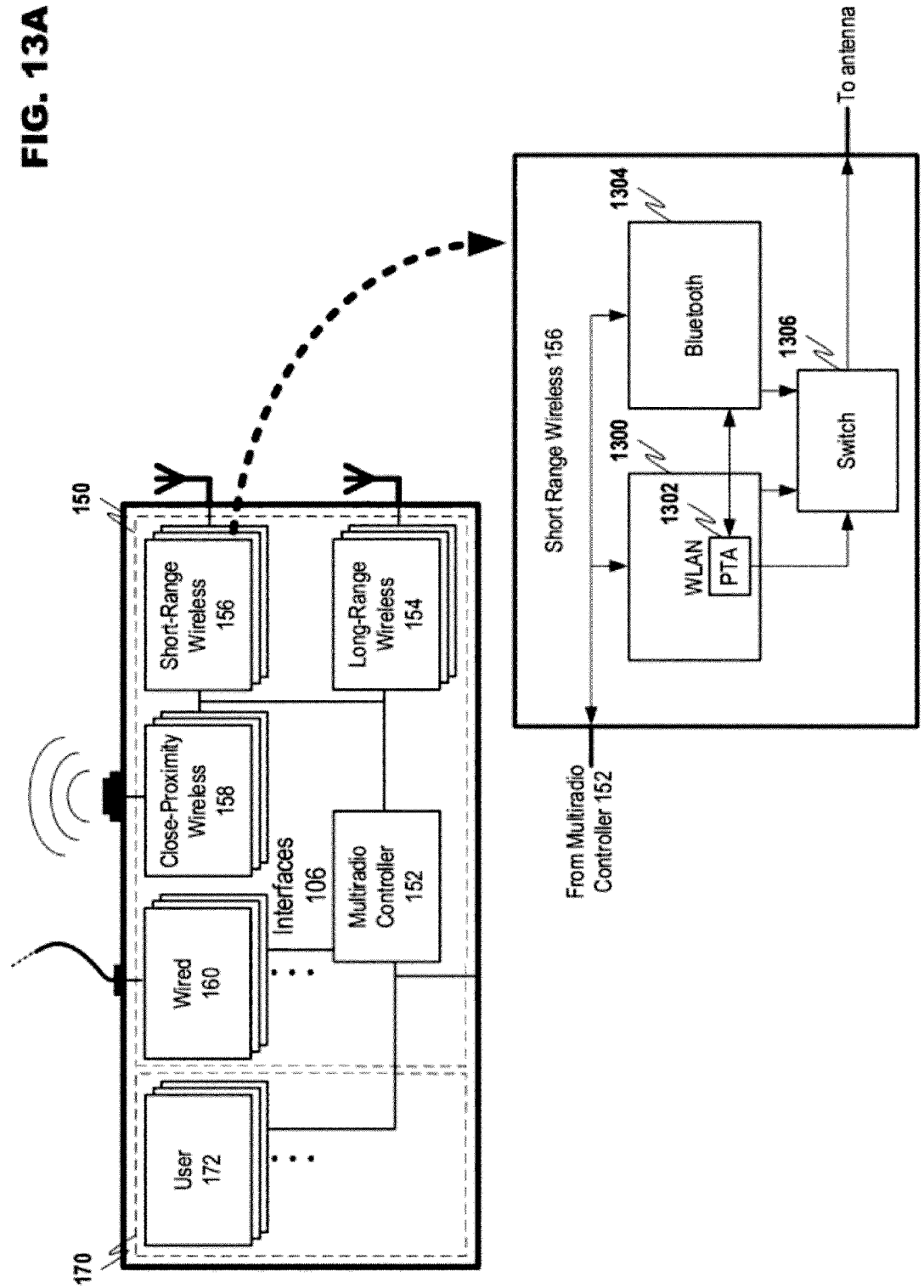

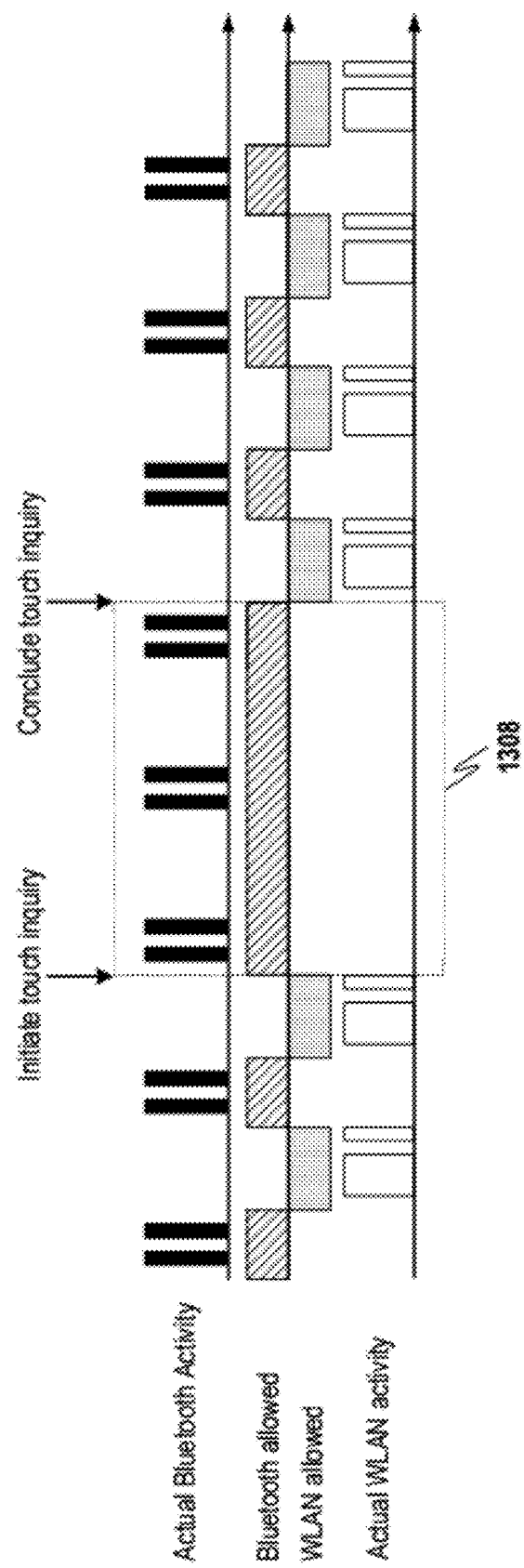

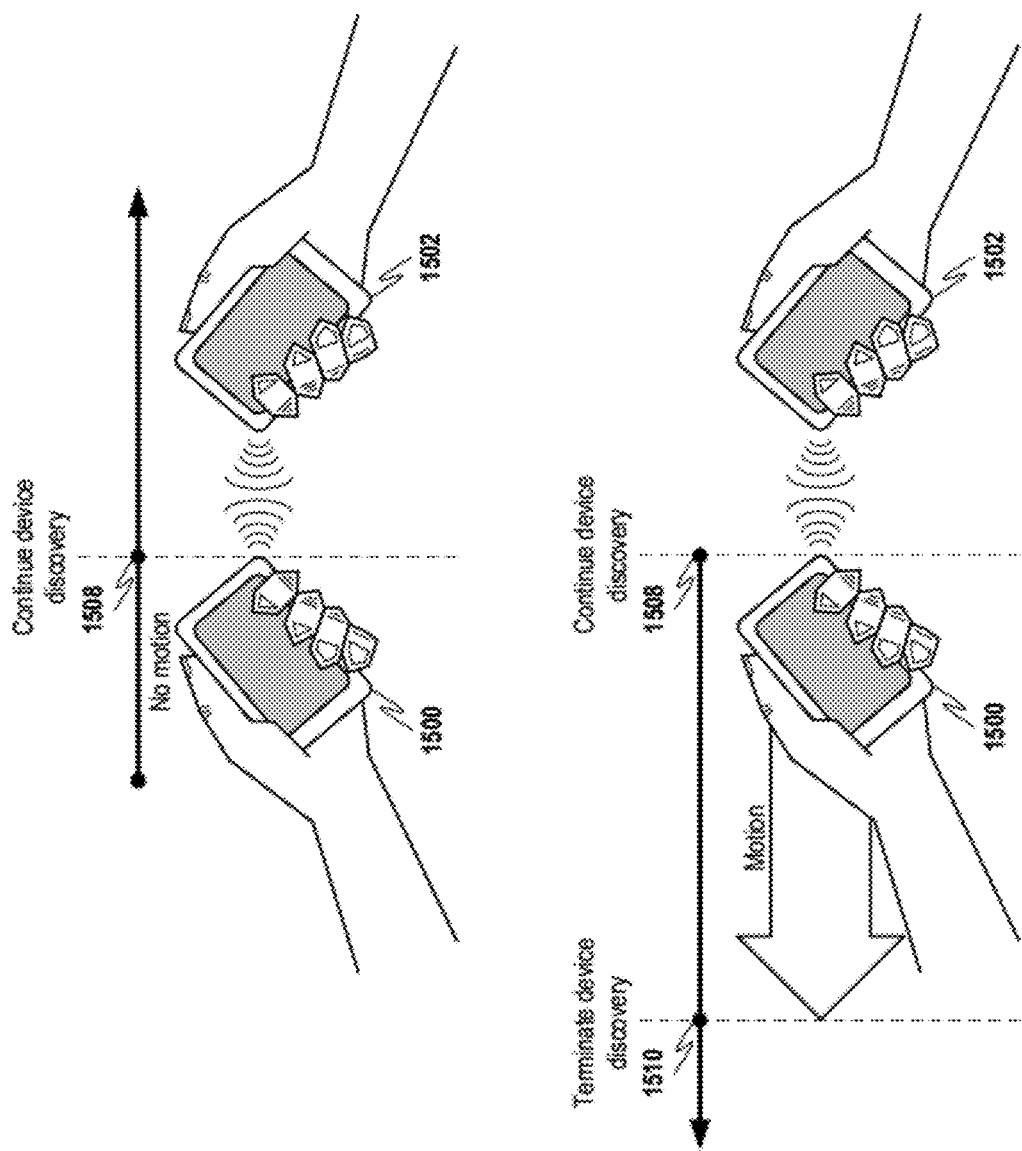

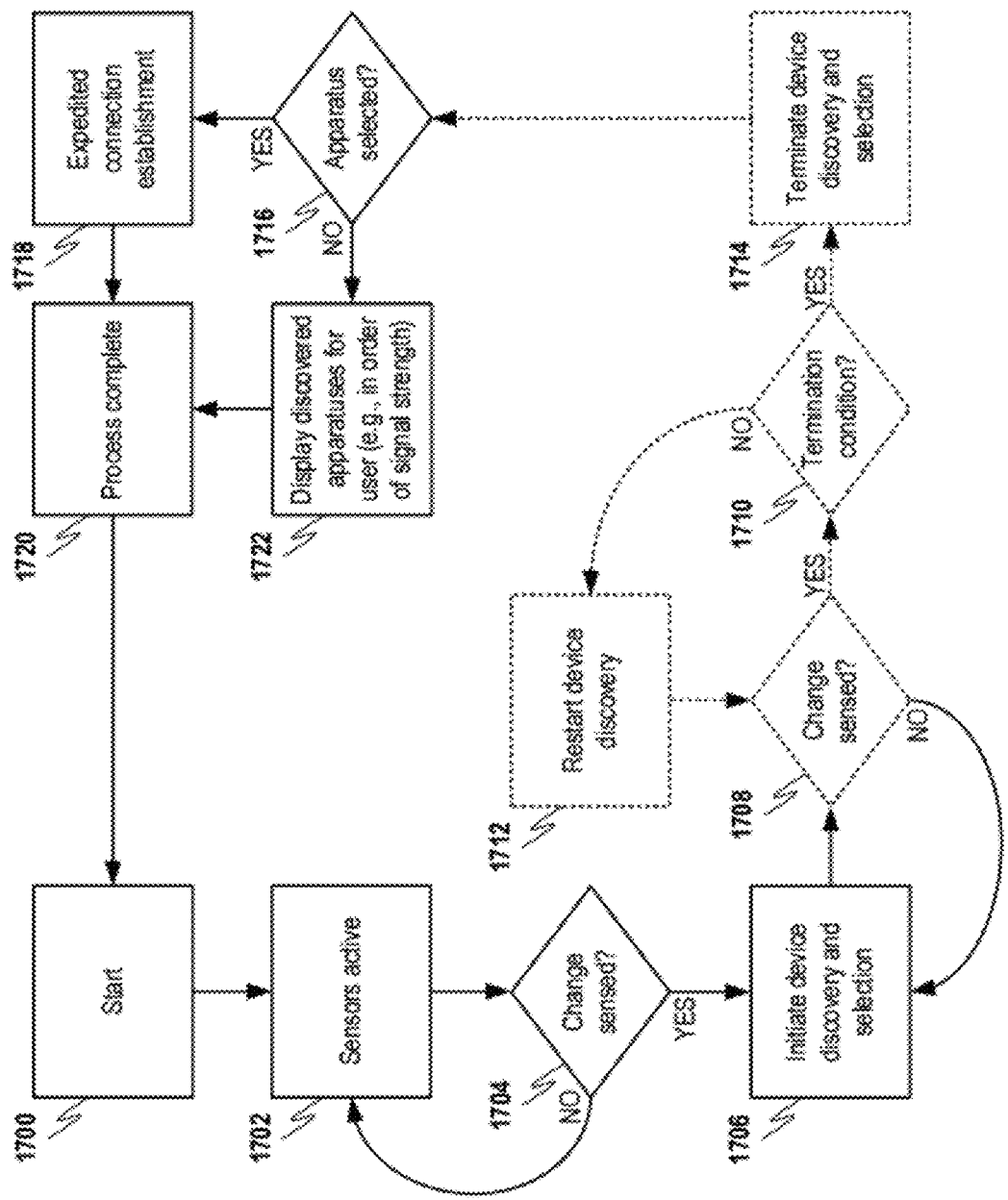

SENSOR-BASED TOUCH INQUIRY CONTROL

PRIORITY

The present U.S. Patent Application is a Continuation-In-Part (CIP) of co-pending U.S. patent application Ser. No. 13/107,145, entitled "TOUCH INQUIRY," that was filed May 13, 2011. The disclosure of the above-identified prior U.S. Patent Application, in entirety, is considered as being part of the present U.S. Patent Application, and thus, is incorporated herein by reference.

BACKGROUND

1. Field of Invention

The present invention relates to wireless communication, and in particular, to facilitating connection establishment between closely situated apparatuses.

2. Background

The ability of apparatuses to communicate wirelessly has progressed beyond the simple conveyance of voice information to encompass a multitude of electronic data types. For example, emerging wireless-enabled apparatuses may exchange textual data (e.g., text messages, emails, etc.), machine-readable data files, multimedia files, directional data, Internet-related data such as a webpage, etc. Electronic data may be conveyed over various wireless mediums, such as via long-range cellular architectures like Code Divisional Multiple Access (CDMA), Global System for Mobile communications (GSM), etc., via short-range wireless networking engaged over Bluetooth, wireless local area networking (WLAN), etc., or via direct device-to-device interactions over very short distances such as in instances of Near Field Communication (NFC).

The forms of communication available to wireless-enabled apparatuses may each have benefits making them appropriate for certain situations. For example, short-range wireless communications may operate in unregulated bandwidth between two or more apparatuses either directly or through a local master apparatus. Communication conducted via such mediums (e.g., Bluetooth, WLAN, etc.) may have benefits in that localized data transfers may occur relatively quickly with the ability to ensure data integrity and security during the transfer. For example, short-range wireless communication may allow for wireless-enabled peripherals (e.g., keyboards, headsets, etc.) to be employed with mobile wireless communication apparatuses for enhancing user experience. Such activity may occur alone or along with data (e.g., business cards, pictures, videos, sound files, etc.) being exchanged amongst these apparatuses without the need for support from long-range wireless networks that may be unavailable in some areas (e.g., indoors).

However, in addition to the above benefits, short-range wireless communications may also entail some configuration burden. As opposed to long-range wireless communications that may utilize a fixed configuration profile that may be recognized by any cell in the network, short-range wireless communications may need to be configured on a network-to-network basis. Therefore, users of apparatuses engaging in short-range wireless communication must have some knowledge of the configuration procedure in order to establish a short-range wireless connection, and even if the user has the requisite knowledge, the time and/or effort expended by the user in setting up the wireless connection may impact negatively on the overall experience of the user.

SUMMARY

Various example embodiments of the present invention may be directed to a method, apparatus, computer program product and system for selectively expediting connection establishment between apparatuses. In accordance with at least one embodiment of the present invention, an apparatus may sense a first change in the disposition of the apparatus, and may initiate device discovery based on the first sensed change. A determination may then be made in the apparatus as to whether another apparatus encountered by the apparatus during device discovery satisfies a predetermined response criteria. The apparatus may then select the other apparatus if it is determined that the other apparatus satisfies the predetermined response criteria.

In at least one example implementation, sensing the first change in apparatus disposition may comprise at least one of sensing that the apparatus is moving in a first direction, that the apparatus is accelerating or that the apparatus has become proximate to an object. The selection another apparatus discovered during device discovery may comprise, for example, expediting wireless connection establishment between the apparatus and the selected apparatus. In accordance with at least one embodiment of the present invention, the apparatus may sense at least one additional change in apparatus disposition, and may alter the device discovery based on the at least one additional change. For example, the apparatus sensing at least one additional change may comprise sensing that the apparatus is moving in a direction different from the first direction, that the apparatus is decelerating, that the apparatus has stopped and/or that the apparatus is no longer proximate to the object. Moreover, the apparatus altering device discovery may comprise at least one of restarting or terminating the device discovery.

It may also be possible that no apparatus is selected during device discovery in that no apparatus encountered during device discovery is determined to satisfy the predetermined response criteria. If no apparatus is selected, identity information corresponding to any other apparatuses that were encountered during device discovery may be displayed on the apparatus. For example, the identity information may be displayed on the apparatus in a list format. The apparatus identity information may be listed in order by strength of signals received from each of the other apparatuses.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2 discloses an example touch activity in accordance with at least one embodiments of the present invention.

FIG. 10 discloses an example host communication interface (HCI) command in accordance with at least one embodiment of the present invention.

FIG. 11 discloses an example event in accordance with at least one embodiment of the present invention.

FIG. 13A discloses an example multiradio control system in accordance with at least one embodiment of the present invention.

FIG. 13B discloses an example of wireless communication medium control based on a prioritization operation in accordance with at least one embodiment of the present invention.

FIG. 15B discloses further examples of motion-related activities that may create sensor input in an apparatus, the sensor input being usable for controlling touch inquiry in accordance with at least on embodiment of the present invention.

FIG. 17 discloses a flowchart of an example communication process in accordance with at least one embodiment of the present invention.

DESCRIPTION OF EXAMPLE EMBODIMENTS

Figure 1A:
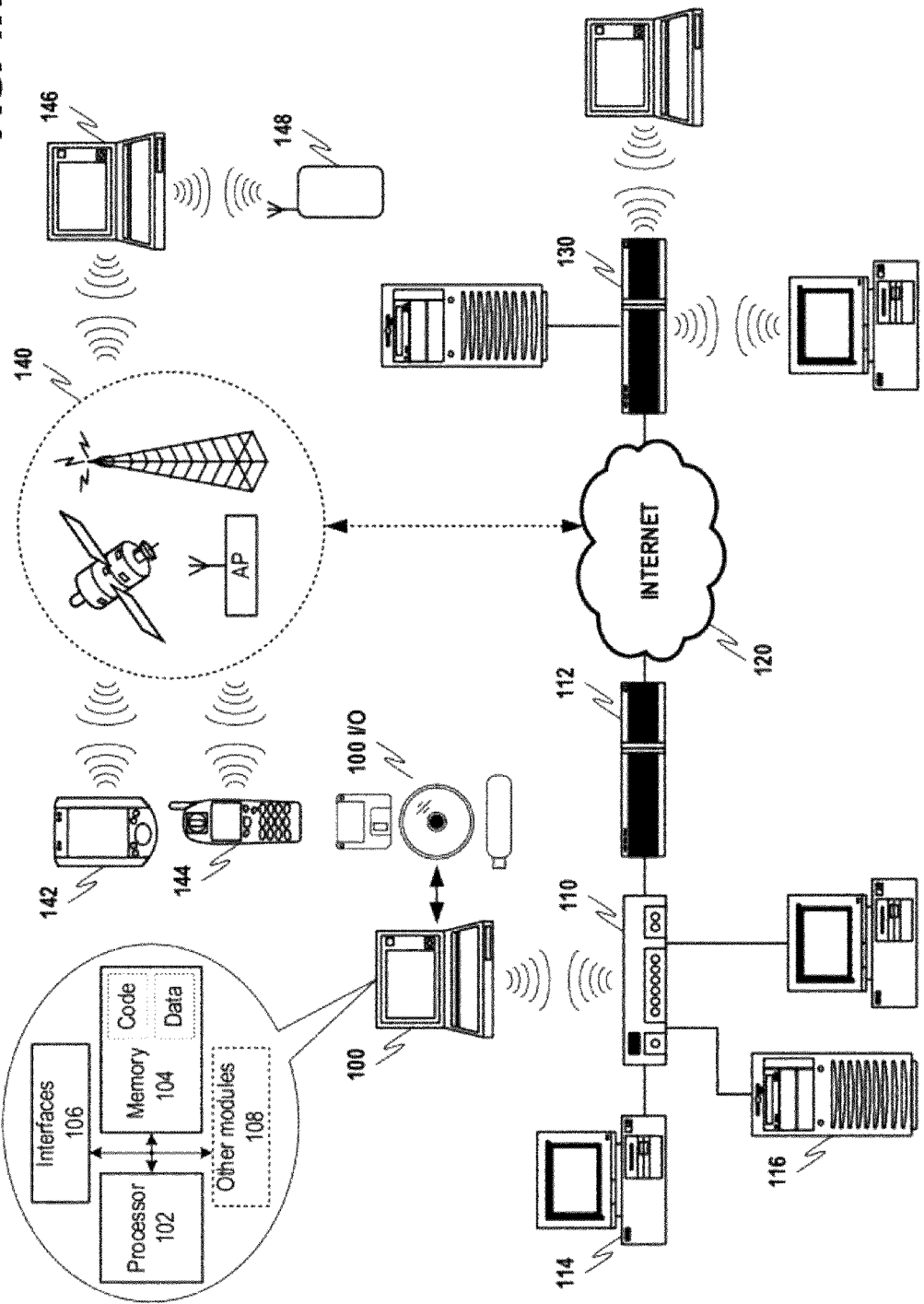
FIG. 1A discloses example apparatuses, systems, configurations, etc. that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or fixed imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1A, and may serve, for instance, as a data input/output means for computing device 100. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 1B:
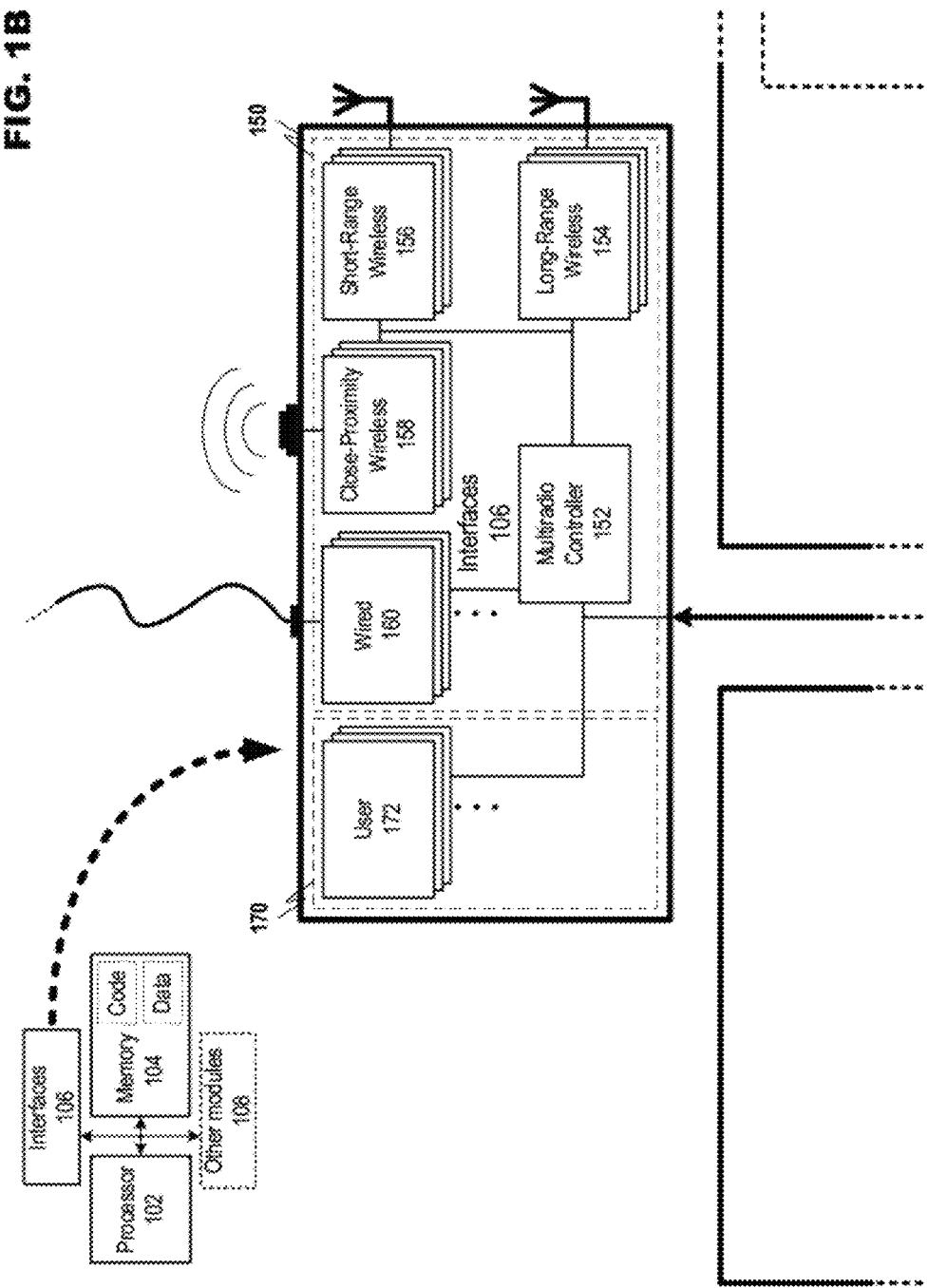
FIG. 1B discloses further detail regarding an example apparatus configuration that may be utilized when implementing the various embodiments of the present invention.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Apparatus Interaction

The conveyance of electronic information is no longer bound by the requirement of being first encoded on physical media for transfer. For example, data may go from creation to distribution to consumption by an end user without ever touching a game cartridge, compact disk (CD), digital video disk (DVD), etc. The removal of the physical medium as an intermediary has influenced the evolution of emerging electronic apparatuses in that traditional resources used for accessing (e.g., reading from and/or writing to) physical media are disappearing. This evolution has placed a new focus on the efficiency and ease-of use for device-to-device communication.

While wired communication may still provide for the reliable conveyance of data between stationary devices, mobile apparatus users demand flexibility without the encumbrances of cables, physical media, etc. While long-range wireless communication mediums may be able to route information between apparatuses, communication does not occur directly between the apparatuses (e.g., it is routed through the cellular base station architecture), which may result in costs to a user for access to a provider's licensed bandwidth, delays caused by indirect routing and traffic on the provider's network, and possible inaccessibility due to long-range wireless data networks not always being available (e.g., indoors). Alternatively, short-range wireless networks may be deemed a better solution in that they provide relatively quick and secure device-to-device communication.

However, short-range wireless communication may require initial configuration. This configuration may involve a user manipulating various menus in an apparatus in order to trigger communication modes that allow apparatuses participating in the wireless interaction to obtain communication configuration information needed for accessing the other apparatuses. For example, apparatuses communicating via Bluetooth may initially go through a "discovery" and then "pairing" processes during which participating apparatuses obtain apparatus identification, security, channel hopping, etc. information that is usable when accessing other apparatuses. These configuration activities take time and skill to complete, which may run contrary to growing user expectation for more immediate and automatic communication operations when utilizing their mobile apparatuses.

III. Example Apparatus Interaction

In accordance with at least one embodiment of the present invention, an example wireless interaction is disclosed in FIG. 2 that, from the viewpoint of a user, may be desirable in that it may greatly simplify information exchanges. In the example shown in FIG. 2, two users may desire to wirelessly exchange electronic data between their mobile apparatuses. In step 200 the users may "touch" their apparatuses together, which may trigger some configuration to occur, and thus result in short-range wireless communication being established between the apparatuses in step 202. Touching, at least for the purposes of the current disclosure, does not require that the apparatuses actually come into physical contact with each other. Holding the apparatuses in close proximity for a short duration of time may be enough to trigger operations, after which the apparatuses may be separated and utilized within the communication range of whatever wireless communication medium is being utilized in order to support apparatus interaction. Such wireless interaction may be implemented utilizing various types of short-range wireless communication. While a multitude of wireless communication mediums are available, the various embodiments of the present invention disclosed herein use Bluetooth for the sake of explanation. The use of Bluetooth in the following disclosure is intended only as an example, and thus, other short-range wireless communication mediums may be employed in implementing the various embodiments.

Bluetooth is an example of a short-range communications technology that was originally intended to replace the cable (s) connecting portable and/or fixed electronic devices, but has grown to facilitate more general wireless communication between various apparatuses. Some of the key features of Bluetooth are robustness, low power consumption and low cost. Many of the features set forth in the Bluetooth core specification are optional, allowing for product differentiation. Existing Bluetooth interaction is based an inquiry method for device discovery, wherein an apparatus inquires about other apparatuses within transmission range and other devices interested in interacting with the inquiring apparatus respond to the inquiry. More specifically, an apparatus performing an inquiry scan is discoverable in that it may respond to inquiry packets that were transmitted from other devices in the inquiry state (e.g., trying to find discoverable devices). The inquiring device and any responding devices may then proceed to form a wireless network (e.g., a Bluetooth piconet) via which apparatus interaction is conducted.

During the inquiry process, when lower-level communication control resources in the inquiring apparatus receive a response from another apparatus, such as a frequency hopping synchronization (FHS) packet, the "found" apparatuses are typically reported to the host (e.g., upper-level processing resources in the inquiring apparatus). Even though multiple response messages may be received from each responding apparatus, it is recommended that the controller report each apparatus to the host only once. An example user interface (UI) operation for this process is disclosed in FIG. 3. In UI 300 the inquiry process has just started and two devices have responded. In UI 300 the inquiry process is complete and all responding apparatuses are displayed in the list, wherein each apparatus responding to the inquiry is listed only once.

In accordance with the various embodiments of the present invention, a usability problem may exist that may impede implementation of the touch system in that all apparatuses within range of the inquiring apparatus may respond to an inquiry. Given existing operations, the user of the inquiring apparatus would then have to recognize which responding apparatus is intended for the touch operation by recognizing its name as listed, for example, in UI 302. Identification may not be straightforward for the user due to, for instance, two or more responding apparatuses having the same default name (e.g., a name given to the device by the manufacturer that was not changed by the user), or the user of the inquiring apparatus not owning the target apparatus (e.g., as in the example of FIG. 2 where the second apparatus in the touch operation is owned by another user). The inquiring apparatus user would then be forced to ask the user of the second apparatus for the name of the target apparatus, which may not be known to many users.

In an existing solution to this problem the inquiring apparatus may measure the signal strength (e.g., Received Signal Strength Indication or RSSI) of each response message, which may be used in ordering the responding devices in UI 302 so that the apparatus with the highest measured signal strength is listed first (e.g., wherein the measured signal strength may correlate to the distance between the inquiring apparatus and the responding devices). However, this solution does not provide reliable results in that the measurement is limited to the first time the response message was received (e.g., since only one response is reported for each apparatus), and thus, the listing in UI 302 may be inaccurate for moving apparatuses such as shown in the touch example of FIG. 2. Further it may happen that, due to the irregularities in the wireless communication medium, the signal strengths of a single transmission might provide false results. Another possible solution may be to implement another form of wireless interaction having a substantially shorter transmission range such as radio frequency (RF) or infrared (IR), wherein communication over the secondary shorter wireless medium may serve as an indicator that the apparatuses are within touch range. However, an obvious barrier to implementing this approach is that hardware/software resources must be implemented to support a second form of wireless interaction that consumes space, power and processing, which are limited in mobile apparatuses.

IV. Example Touch Implementation

The various embodiments of the present invention do not suffer from the above deficiencies, and thus, may be able to implement continuous sensing for device-to-device touch operations all within a single wireless communication medium. Touch operations, in at least one example implementation, may sense when apparatuses are being held or moved closer together and may trigger automated wireless connection establishment between only apparatuses that are within close proximity of each other. In particular, features that are available in the Bluetooth Specification 4.0 in regard to extended inquiry response (EIR) may be leveraged, wherein EIR responses shall be reported to the host multiple times during an inquiry scan. These features may also be enabled for apparatuses not configured to transmit EIR packets by requesting that these apparatuses are reported to a host more than once, which is allowed by the specification but not typically implemented.

Figure 4:
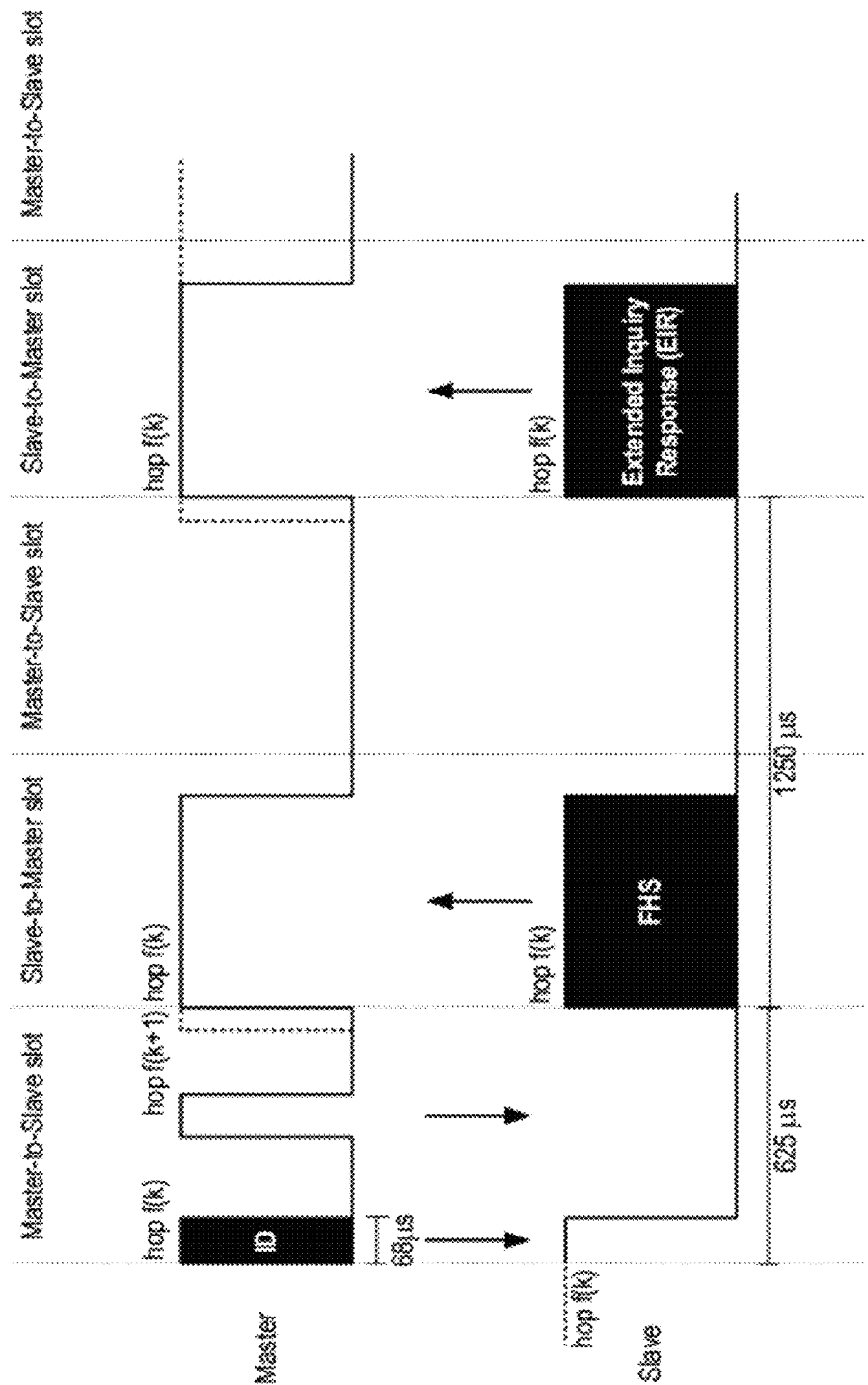
FIG. 4 discloses an example of wireless connection establishment in accordance with at least one embodiment of the present invention.

In the example of Bluetooth, inquiring apparatuses transmit ID packets that may be scanned by discoverable apparatuses. Discoverable apparatuses may then respond to the ID packets by transmitting an FHS packet. Discoverable apparatuses may further transmit an EIR packet after the FHS packet to deliver additional information including, for example, apparatus name, transmission (Tx) power, etc. An example wireless interaction is disclosed in FIG. 4. The default duration of a Bluetooth inquiry scan is 11.25 ms when performing a standard scan and 22.5 ms when performing an interlaced scan. The default value for an inquiry scan interval is 2.56 s. In the example of FIG. 4, the master-to-slave slot time may be 625 µs, and the total master-to-slave and slave-to-master slot time may be 1250 µs. An inquiry may be performed in order to find discoverable devices within transmission range. Apparatuses in a discoverable mode that receive inquiry packets (e.g., ID packets, typically having a duration of 68 µs) may transmit a response including a FHS packet. The FHS packet may comprise at least Bluetooth address, device class, whether an extended inquiry response follows, page scan mode and clock phase. Clock offset and address information may be utilized by inquiring devices to estimate channel information, hop(k), so that communication may be continued on future channels, hop f(k+1), in accordance with a frequency hop pattern. Estimating hop pattern information may allow the inquiring apparatus to follow the hops of the responding apparatus in order to establish a network connection with the responding apparatus.

An EIR procedure may also be executed by apparatuses responding to the inquiry. An extended inquiry response procedure may include the transmission of an EIR packet that may provide miscellaneous information above what is delivered in the basic inquiry response (e.g., in an FHS packet). An EIR packet may typically comprise information regarding, for example, services offered by the apparatus or some vendor specific information. The impending transmission of an EIR packet may be indicated by an EIR indicator bit that is set in the FHS packet. For example, device discovery may be expedited by user-friendly names not being sent in FHS packets, and thus, in order to show a user-friendly name for a discovered device the name must be provided in an EIR packet (e.g., unless the Bluetooth address is already mapped to the user-friendly name in the device memory). If it is indicated in an FHS packet that an EIR packet follows (e.g., the EIR bit is set), EIR packet transmission may commence in the next slave-to-master slot and may further extend over up to five (5) slots. EIR packets are asynchronous connectionless link (ACL) packets of type DM1, DM3, DM5, DH1, DH3 or DH5.

Certain behaviors may be built into apparatuses in order to facilitate discovery. For example, in order to avoid repeated collisions between devices that simultaneously wake up in the same inquiry hop channel, a device shall back-off for a random period of time. Thus, if an apparatus receives an ID packet and responds by transmitting an FHS packet, it shall generate a random number, RAND, between 0 and MAX_RAND. MAX_RAND may be 1023 for scanning intervals ≥1.28 s. For scanning intervals <1.28 s, MAX_RAND may be as small as 127. Profiles that use a special dedicated inquiry access code (DIAC) may select a MAX_RAND>1023 even when the scanning interval is ≥1.28 s. Discoverable apparatuses may return to a CONNECTION or STANDBY state for the duration of at least RAND timeslots. Before returning to the CONNECTION or STANDBY state, the device may go through the page scan sub-state.

After at least RAND timeslots, a discoverable apparatus shall add an offset of "1" to the phase in the inquiry hop sequence (e.g., the phase has a 1.28 s resolution) and then return to the inquiry scan sub-state again. If a discoverable apparatus is triggered again, it shall repeat the procedure using a new RAND. The offset to the clock accumulates each time an FHS packet is returned. During a probing window, a discoverable apparatus may respond multiple times, but on different frequencies and at different times. Reserved synchronous slots should have priority over response packets, wherein if a response packet overlaps with a reserved synchronous slot, it shall not be sent but waits for the next inquiry message. If a device has EIR data to transmit but the EIR packet overlaps with a reserved synchronous slot, the FHS packet may be sent with the EIR bit set to zero in accordance with the Bluetooth specification v4.0, incorporated herein by reference.

In view of the above, inquiry responses can be received by an inquiring apparatus within roughly 80 to 640 ms, depending on the inquiry scan interval of discovered devices. The random back-off for devices using scanning interval<1.28 s is from 0 to 79,375 ms and for other apparatuses (e.g., utilizing the default inquiry interval) is from 0 to 639,375 ms. In view of these operating characteristics, collecting responses from all apparatuses within communication range in an ideal (e.g., error-free) environment, the inquiry sub-state may have to last for 10.24 s unless the inquiring apparatus receives enough responses and aborts the inquiry sub-state earlier. In some instances (e.g., in an error-prone environment), the inquiring apparatus may also extend the inquiry sub-state to increase the probability of receiving all responses. As a consequence of an extended inquiry state and relatively short back-off times, multiple responses may be received from some or all of the responding apparatuses.

As mentioned above, more recent Bluetooth specifications are evolving to incorporate features that may be utilized in accordance with at least one embodiment of the present invention. For example, Section 7.1.1 of the Bluetooth Specification v4.0, entitled "Inquiry Command," states that "A device which responds during an inquiry or inquiry period should always be reported to the Host in an Inquiry Result event if the device has not been reported earlier during the current inquiry or inquiry period and the device has not been filtered out using the command Set_Event_Filter. If the device has been reported earlier during the current inquiry or inquiry period, it may or may not be reported depending on the implementation (depending on if earlier results have been saved in the BR/EDR Controller and in that case how many responses that have been saved). It is recommended that the BR/EDR Controller tries to report a particular device only once during an inquiry or inquiry period. When reporting discovered devices to the host, the RSSI parameter measured during the FHS packet by each responding device may be returned." Moreover, section 7.7.38 entitled "Extended Inquiry Result Event" states " . . . . If an extended inquiry response packet from the same device is correctly received in a later response, another event shall be generated." Thus the lower-level communication controller may generate events for every an EIR packet it receives, regardless whether the inquiry response has already been reported. It is this constant event generation that may prove beneficial to implementing automated communication configuration and linking in various example implementations.

Figure 5:
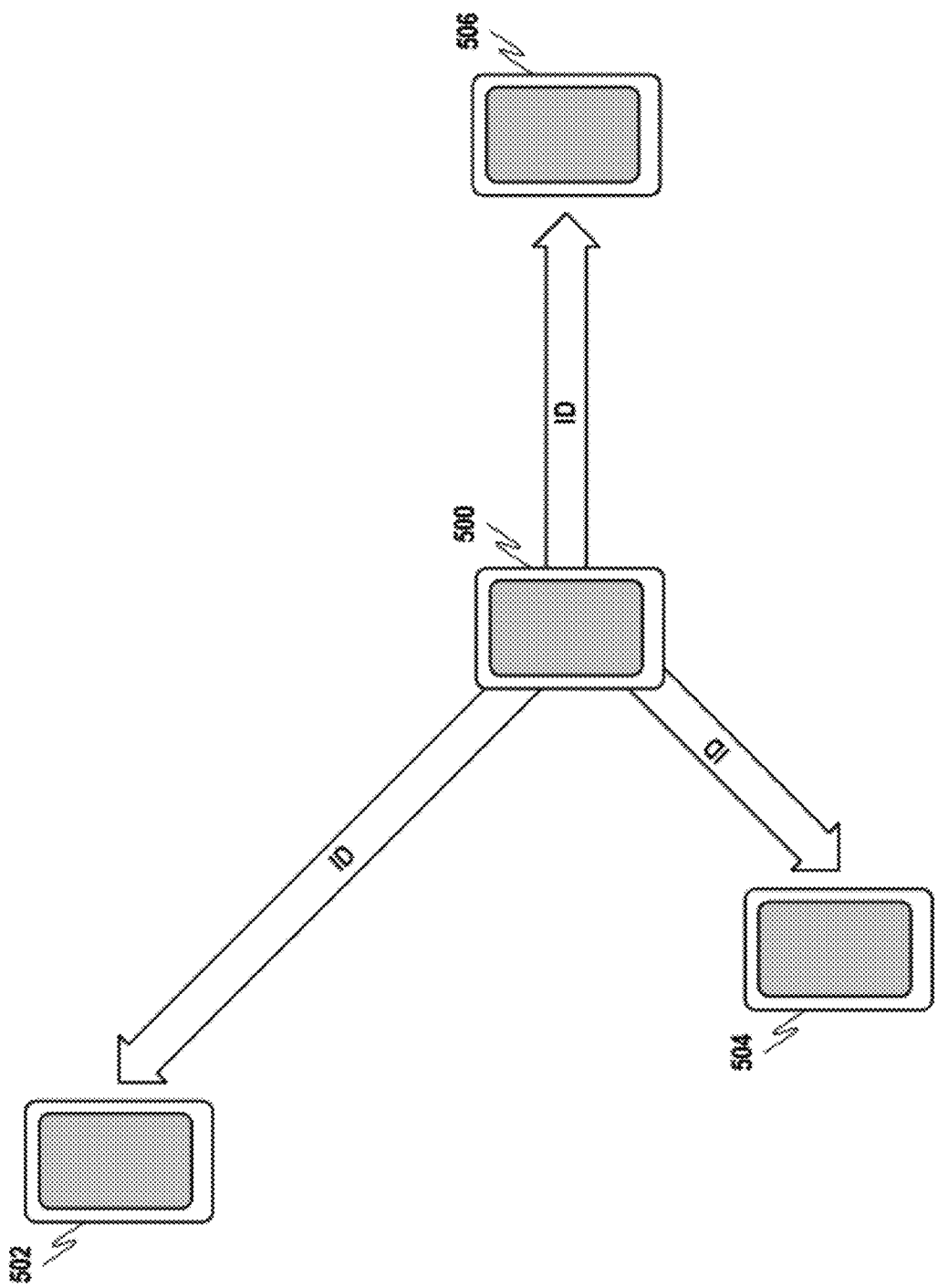
FIG. 5 discloses an example ID packet transmission in accordance with at least one embodiment of the present invention.

For example, four apparatuses 500-506 may be within communication range of each other as disclosed in FIG. 5. Apparatuses 500-506 may all be capable of communicating utilizing the same wireless communication medium (e.g., Bluetooth). In an example usage scenario, the user of apparatus 500 may desire to exchange data (e.g., business cards, pictures, music or multimedia files, etc.) with apparatus 506. Apparatus 500 may then enter an inquiry mode where ID packets are transmitted. The ID packet can be general inquiry access code packets (GIAC) or DIAC packets. Apparatuses 502-506 may then receive these ID packets.

Figure 6:
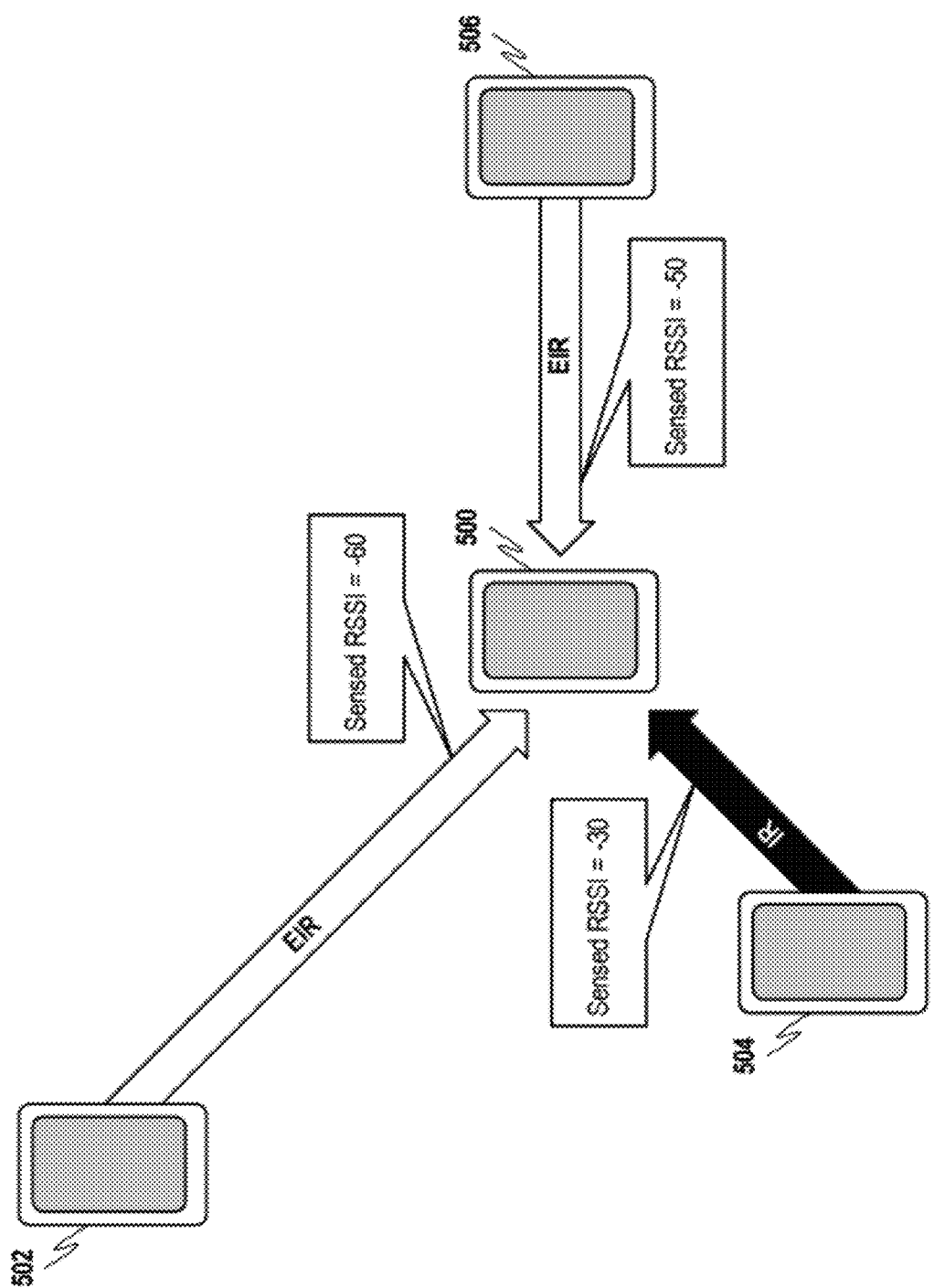
FIG. 6 discloses an example of signal strength measurement in accordance with at least one embodiment of the present invention.

In FIG. 6 apparatuses 502-506 may transmit packets responding to the ID packets received in FIG. 5. In particular, apparatuses 502 and 506 may transmit an EIR (e.g., an FHS packet followed by an EIR packet), while apparatus 504 may only transmit an inquiry response (IR) including just an FHS packet. The host in apparatus 500 may receive EIR events triggered by the responses of apparatuses 502 and 506, but not 504. In accordance with at least one embodiment of the present invention, this lack of EIR event reporting for apparatus 504 may be utilized as an initial filter for excluding apparatus 504 as a potential touch apparatus (e.g., apparatuses that do not transmit EIR packets are not touch apparatuses). However, it is important to note that other embodiments of the present invention may be configured for apparatuses that do not have the ability to send EIR packets. A system where a lack of EIR response is utilized as a filter is just one example.

The reported EIR events may include RSSI measurement values as shown, for example, with respect to apparatuses 502 and 506. From the RSSI values the host in apparatus 500 may detect when a device is most likely in "touching range" (e.g., within a distance from the inquiring apparatus that indicates touching-related operations should be executed). For example, there can be predetermined response criteria including one or more events indicating that an apparatus is within touching range is required to verify that the device is close enough.

Figure 7:
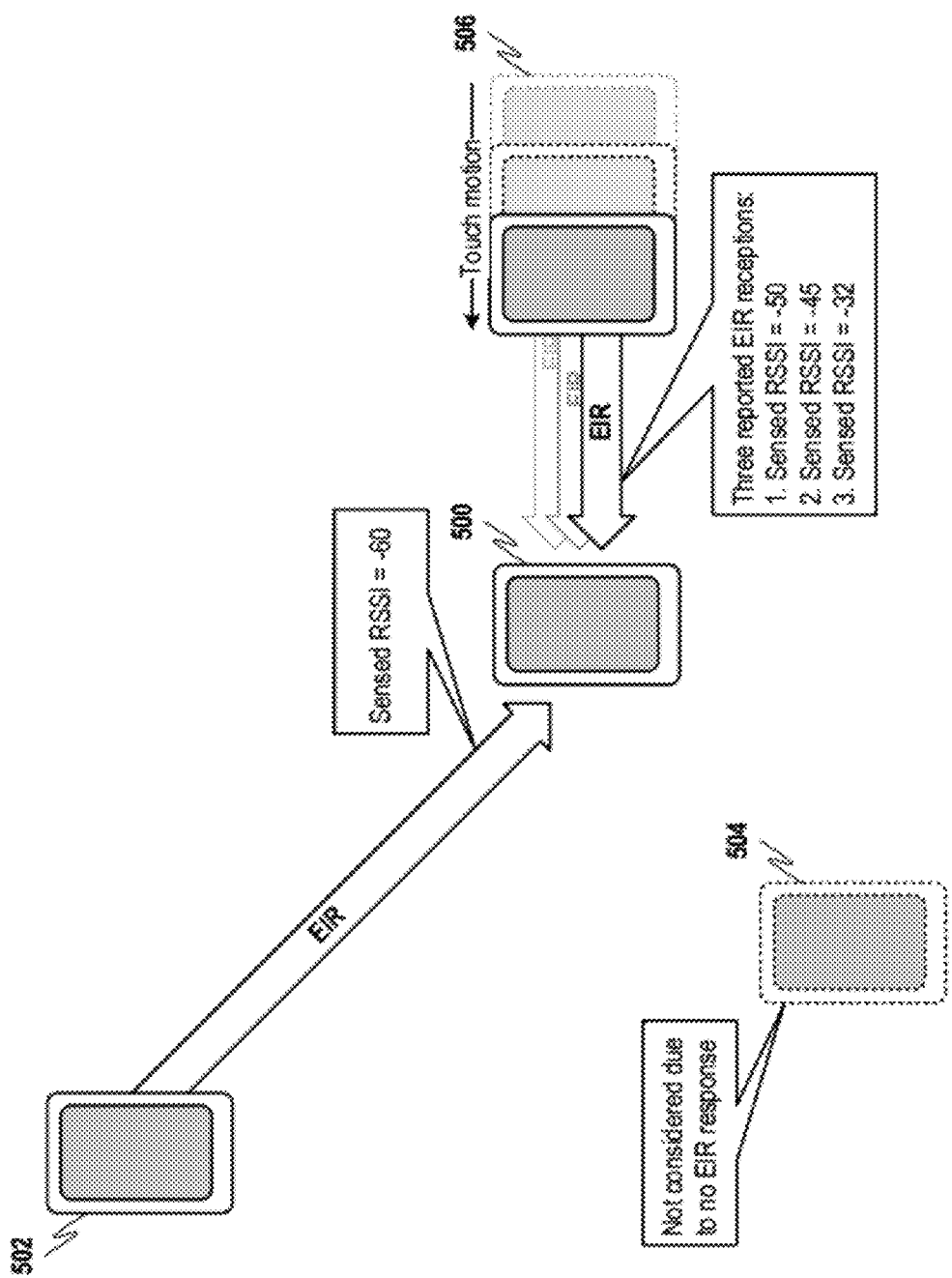
FIG. 7 discloses another example of signal strength measurement in accordance with at least one embodiment of the present invention.

It may also be possible to determine when apparatuses are being moved closer to the other apparatus in order to "touch" apparatuses, or alternatively, when an inquiring apparatus is being moved closer to other apparatuses. An example of the first instance is disclosed in FIG. 7. In the disclosed example a Bluetooth controller in apparatus 500 may receive multiple inquiry responses from apparatuses 502 to 506. The response from apparatus 504 does not provide an EIR, and so Bluetooth controller may only report the first of a multiple of responses to host software stack as HCI Inquiry Event that may contain RSSI of the received response. This may allow apparatus 500 to handle the response in a "standard" manner, wherein the apparatus is displayed in UI 302 in order based on the sensed RSSI. In instances where EIR responses are received (e.g., from apparatuses 502 and 506), the Bluetooth controller may report each received EIR as a HCI EIR Event. This becomes important where apparatus 506 in FIG. 7 is being moved closed to apparatus 500. Because the controller also reports an RSSI for each EIR response, it is easy to track the changing RSSI levels and the movement of apparatus 506. When the measured RSSI satisfies predetermined response criteria (e.g., including the RSSI being measured to be at or above a predetermined level), the corresponding apparatus may be selected for touch-related operations (e.g., expedited connection establishment). In accordance with at least one embodiment of the present invention, apparatus sensor information (e.g., movement or acceleration sensors in the apparatus) may be utilized to determine when, for example, an inquiring apparatus has stopped moving, which may indicate in the apparatus is when touch measurements may be taken (e.g., when the user of the apparatus has stopped moving the apparatus towards another apparatus in order to touch the two apparatuses). Apparatuses having high enough RSSI in this position may be selected for touch-related processing.

In FIG. 7 apparatus 500 is an inquiring device. Apparatuses 502 and 506 respond with EIR and apparatus 504 responds with the normal IR. The BT controller of apparatus 500 reports these responses to its host which also has Touch selection software running Typical response criteria, as shown in FIG. 7, may include RSSI values being sensed above certain fixed threshold value, like −30 dBm. Sensing a response packet having −30 dBm will then trigger device selection while −31 dBm will not. It may also be possible that responding apparatuses may send Tx power information in EIR packet, as this is an existing feature in the Bluetooth specification v4.0. In instances where Tx power information is available in the EIR packet, the predetermined response criteria may include an adjustable RSSI threshold value that accounts for the Tx power. For example, the threshold value may be set at 30 dBm below the EIR Tx power, so that if the Tx power level in an FHS packet is +20 dBm then the threshold value that will trigger selection will be the FHS packet being measured at −10 dBm, or 30 dBm below of Tx power level. Secondly, to ensure that apparatuses are maintained in close proximity, the predetermined response criteria may require that more than one EIR must have a sensed RSSI for the corresponding FHS packet at or above a threshold value. In addition different thresholds could be used for different phases, for example, first the threshold value may be set above −45 dBm to select one or more candidate apparatuses and then second, finally deciding the threshold value may be set above −30 dBm.

Another filtering factor for selecting apparatuses for touch operations may be based on services available in a responding apparatus. For example, EIR packets may contain service level information, and so only responses above certain measured signal strength level and from device(s) supporting certain types of BT services (e.g. RSSI above −30 dBm and OBEX file transfer supported) may be selected for touch-related operations. Multiple apparatuses (e.g. two apparatuses next to each other) may be selected, triggering expedited connection establishment between the inquiring device and the two selected apparatuses. It may also be possible to select multiple devices by touching them one after another, wherein all addresses that satisfy the predetermined response criteria (e.g., that have an RSSI above set threshold) may be selected in order. In this way you can easily select a distribution group containing more than one apparatus.

It may also be important for a responding apparatus to make sure that an inquiring apparatus is within touching range, and not some other device that is far away, in order to ensure that communication is established with the desired apparatus. There are several possibilities for checking touch proximity. A connection between the devices may be created after the touch and responding apparatuses determine if the sensed RSSI levels meet predetermined response criteria corresponding to a close proximity device. The responding apparatus may utilize vendor specific commands that provide RSSI information for the particular connection. If it is determined that the predetermined response criteria have been satisfied, data may be accepted from the inquiring apparatus. Otherwise the connection can be refused. Operating using this type of check may cause some delay in the connection establishment process because the apparatuses have to be in close proximity all the time. It may be also possible for a responding apparatus equipped for touch operations to be configured to measure the RSSI of all received ID packets in certain instances (e.g., when a touch mode is active). Having this information at the outset would speed up the process as the connection does not have to be established before checking the RSSI of ID packets received from a particular inquiring apparatus (e.g., the responding apparatus does not transmit response messages to the particular inquiring apparatus). In accordance with at least one embodiment of the present invention, a touch mode may be initiated by the motion of touching the devices. In particular, the motion may be registered by acceleration sensor, which may activate the touch mode by performing steps such as activating Bluetooth in the apparatus and putting the apparatus in a visible Bluetooth pairing mode for a certain duration (e.g., 10 s). The inquiring apparatus may then transmit ID packets received by the responding apparatus which accepts the connection (e.g., if it is determined to satisfy predetermined response criteria).

Figure 8:
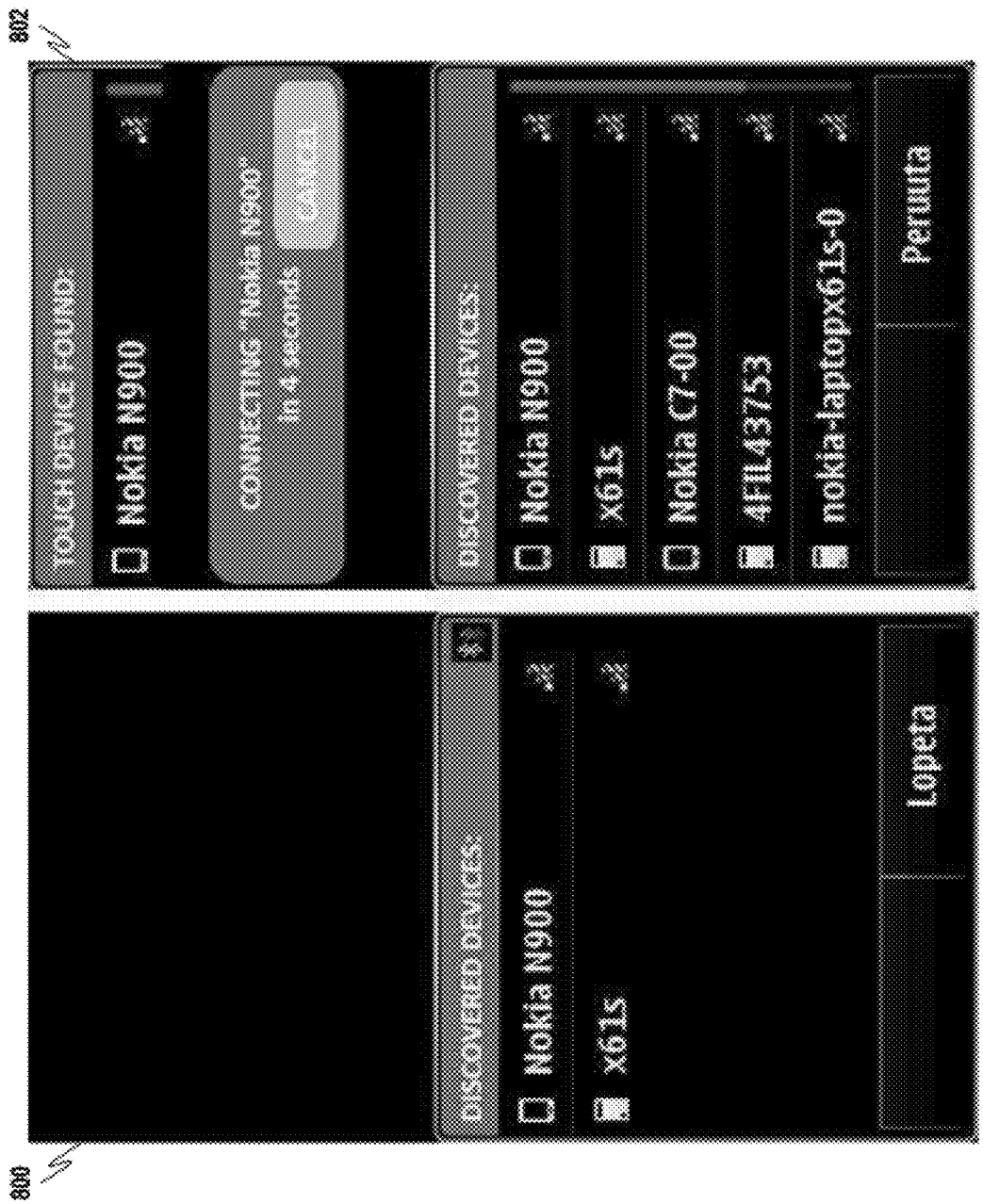
FIG. 8 discloses a modified example user interface display indication in accordance with at least one embodiment of the present invention.

FIG. 8 discloses an example user interface response in accordance with at least one embodiment of the present invention. Similar to FIG. 3, UI 800 displays the beginning of the inquiry process when information is first being received by an inquiring apparatus. Some of the response apparatuses (e.g., "Nokia N900" and "x61s") are already being discovered and displayed for the user at this stage. In UI 802, a touch apparatus has been identified. In accordance with the previously disclosed example implementations, some determination has occurred within the inquiring apparatus that resulted in a finding that the responding apparatus "Nokia N900" meets the predetermined response criteria, which has resulted in the apparatus being selected for touch operations. In this example touch operations includes expedited connection establishment, which is shown in UI 802 where an indication is presented to the user that the apparatus "Nokia N900" will be automatically connected to the inquiring apparatus within 4 seconds. It is important to note that UI 802 and the particular indications presented therein are merely for the sake of explanation in the present disclosure. The various embodiments of the present invention are not limited specifically to the activities disclosed in FIG. 8, and thus, other actions related to wireless connection establishment between two or more apparatuses may also be executed as a result of determining that the responding apparatus satisfies the predetermined response criteria.

V. Example Device Discovery Interval Configuration

In accordance with at least one embodiment of the present invention, selective connection establishment may be expedited between apparatuses. While Bluetooth has been utilized principally for the sake of explanation herein, the various embodiments of the present invention are not limited only to being implemented using Bluetooth wireless communication. Other wireless communication mediums having similar characteristics may also be employed.

Figure 9:
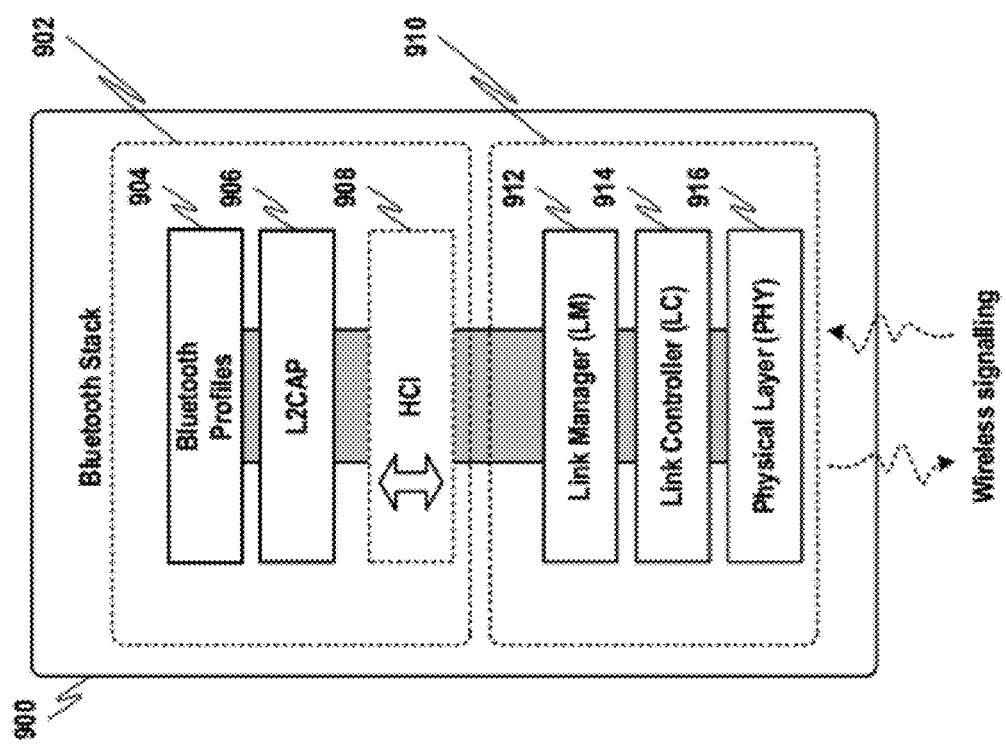
FIG. 9 discloses an example Bluetooth communication stack in accordance with at least one embodiment of the present invention.

For example, touch operations may utilize signal strength (e.g., as indicated as part of Bluetooth device discovery or Bluetooth "inquiry" response events) to identify close proximity apparatuses. Events are signals that may be generated from a Bluetooth controller (e.g., in a Bluetooth radio integrated circuit or "chip") and transmitted to the host (e.g., the upper-level processing resources of the apparatus) to indicate issues encountered by the Bluetooth controller. An example of these entities is disclosed with respect to apparatus 900 in FIG. 9. Bluetooth may be visualized as a series of protocol steps (e.g., depicted as a protocol stack) when transmitting/receiving using Bluetooth. The protocol stack may include elements tasked with conveying information from the system level to the physical layer where it may be transmitted wirelessly to another device. The host, which in accordance with this disclosure comprises at least the upper levels of the protocol stack as shown at 902, may interact with the Bluetooth controller (e.g., more generally "radio") that comprises at least the lower portion of the protocol stack as shown at 910 via host control interface (HCI) 908. In at least one example implementation, host 902 may exist as software executed by processing resources within apparatus 900, while Bluetooth controller 910 may be implemented as a combined hardware and software based solution (e.g., as an integrated circuit).

Bluetooth Profiles 904 may include various types of definitions describing, for example, wireless communication configurations needed to access other apparatuses or standard profiles that applications may utilize when engaging in wireless communication via Bluetooth. Bluetooth profiles 904 for other apparatuses may be established through "pairing." Pairing is a process where apparatuses may participate in an initial polling/response interaction to exchange identification and connection information that may be saved in order to expedite reconnection at a later time. After applications and/or target apparatuses are established, information to be sent must be formatted for transmission. L2CAP level 906 includes at least a logical link controller and adaptation protocol that support higher level protocol multiplexing packet segmentation and reassembly and the conveyance of quality of service (QoS) information. Information prepared by L2CAP level 906 may then be passed to HCI 908 as defined above. This layer may act as a command interface to lower link manager protocol (LMP) layers (e.g., link manager (LM) 912 and link controller (LC) 914). LM 912 may establish link setup, authentication, configuration and may perform other protocol steps pertaining to connection establishment. LC 914 may also help to manage active links between apparatuses by handling low-level baseband protocols. Wireless packet transmission/reception may then be facilitated through the wireless hardware (e.g., modem, antenna, etc.) and corresponding support software associated with physical layer (PHY) 916. The disclosed Bluetooth protocol stack may also be utilized in an order reversed from that disclosed above in order to receive wireless transmissions. During normal operation, Bluetooth controller 910 may generate Device discovery response events comprising RSSI information that may help to facilitate the identification of close proximity apparatuses during touching.

Two types of Bluetooth device discovery response events carry RSSI information: Device discovery Response events with RSSI and Extended Device discovery Response (EIR) events. The current Bluetooth specification does not require the generation of an event corresponding to each time an apparatus is discovered. On the contrary, the specification recommends that every encountered apparatus is reported only once during device discovery (e.g., an inquiry). New EIR events may be generated for previously found apparatuses only if previous responses corresponding to the same apparatuses were erroneous. As a result, the behavior of Bluetooth controllers from different chip vendors is inconsistent. Some Bluetooth radios generate EIR events every time and some do not. This is problematic as touch inquiry requires that events including RSSI information are delivered to the host every time an apparatus is encountered during device discovery. In particular, this is problematic from the host prospective because not generating events every time an apparatus is encountered may cause touch inquiry performance to degrade (e.g., it may take longer to identify apparatuses within touch range). In existing systems there is no way to control this behavior from host side. By default, device discovery response events are currently generated only once per device during device discovery, and EIR events may be generated every time, but this operation is vendor specific and not controllable by the host.

In accordance with at least one embodiment of the present invention, the host-side controller may set the circumstances in which Bluetooth events are generated, especially device discovery response events. The Host may generate HCI command that may be sent to Bluetooth controller. HCI command generation may depend on, for example, application requirements (e.g., the activation of touch device discovery in an apparatus). For example, touch inquiry may be utilized in near proximity file sharing applications. Example applications may utilize the object exchange (OBEX) push profile to send multimedia files, pictures, etc. to remote device using touch device discovery as a means to select the destination device. For example, a file may be selected and device discovery (e.g., Bluetooth inquiry) may begin receiving RSSI information in order to find close proximity apparatuses. This reporting may be done with device discovery response events. Touch inquiry based on EIR events would be ideal for this application because the apparatus name and other service information is already provided by default in EIR events, eliminating the need for any additional information requests.

However, as described above event reporting does not necessarily happen every time an apparatus is found. In order to get apparatuses reported every time they are encountered, host 902 needs to indicate to Bluetooth controller 910 how this event reporting needs to be done. An HCI command may be defined that indicates the manner in which device discovery response event(s) may be generated, an example of which is disclosed in FIG. 10. HCI command 1000 may be sent to Bluetooth controller 910 on different occasions. For example, command 1000 may be sent to Bluetooth controller 910 when apparatus 900 is activated so that device discovery event generation is the same for all applications. However this level of reporting may prove unnecessary in many device discovery situations, and thus, certain operational modes may be triggered in accordance with certain applications (e.g., close proximity file sharing). HCI command 1000 may contain byte settings that trigger various functionalities in Bluetooth controller 910. In particular, bytes 5 and 6, as shown at 1002 and 1004 respectively, may control the functionality related to event reporting. The various configurations of byte 5 may be utilized to set event mode generation for device discovery results with RSSI events. In the example disclosed in FIG. 10, setting byte 5 to "0" (00) may trigger Bluetooth controller 910 to operate in a vendor default mode (e.g., a default operational mode set by the radio manufacturer). Setting byte 5 to "1" (01) may cause Bluetooth controller 910 to generate a report for an apparatus only once during device discovery, and setting byte 5 to "2" (10) may cause Bluetooth controller 910 to generate an event each time a device is found during an device discovery. This last mode may be useful during touch inquiry as apparatuses (and their corresponding measured RSSI) will be reported continually during device discovery, allowing a quicker determination as to whether the sensed device is within touch range, is moving into touch range, etc. Byte 6 may be utilized to control event generation for device discovery results with EIR events. Example byte settings are disclosed at 1004 wherein Bluetooth controller 910 may be commanded to generate events based on a vendor default mode "0" (00), once per device discovery "1" (01) or each time an apparatus is encountered "2" (10).

FIG. 11 discloses an example event 1100 that corresponds to command 1000. In particular, event 1100 may be generated in response to receiving command 1000 to confirm the current configuration of Bluetooth controller 910. Example bytes 5 and 6, as shown at 1102 and 1104 respectively, may confirm the current settings related to event generation during device discovery. Despite being instructed by command 1000 to enter a particular operational mode, it is possible that Bluetooth controller 910 may not (or cannot) enter the requested operational mode. For example, it is possible that the particular Bluetooth controller 910 (e.g., embodied as an individual chip or chipset installed in apparatus 900) does not understand the command or support the requested operational mode. It may also be possible that apparatus 900 is not in condition to enter the requested operational mode (e.g., may be low on power, too busy with other wireless traffic, etc.) and may block Bluetooth controller 910 from entering the requested mode. In addition, security, manual configuration, or other control measures may block entry into the operational mode. This information may, in turn, be utilized to set other operational conditions in apparatus 900, such as device discovery interval length as discussed in FIG. 12.

Figure 12:
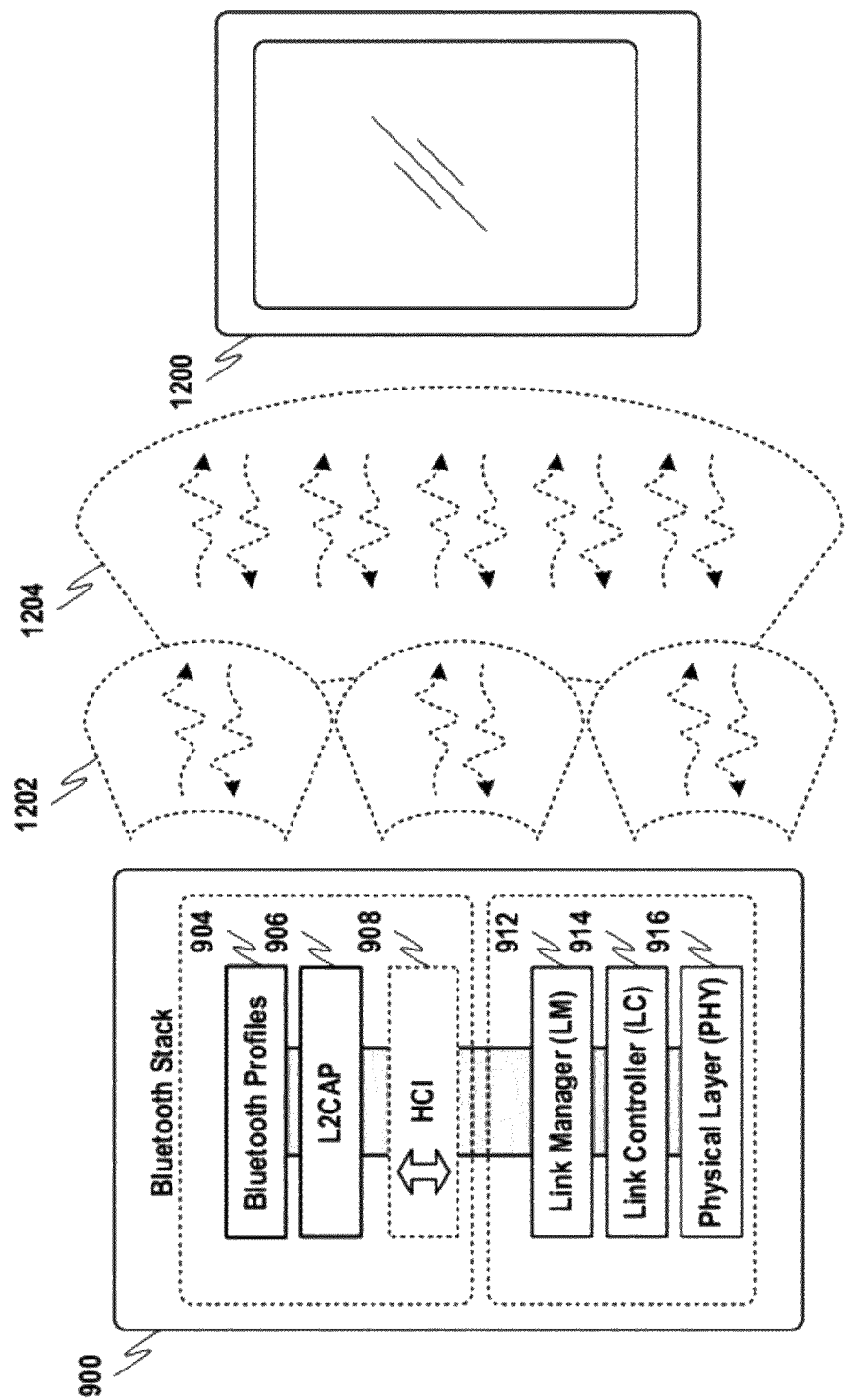
FIG. 12 discloses example short and long interval inquiries in accordance with at least one embodiment of the present invention.

In FIG. 12 apparatus 900 is disclosed performing an example short interval device discovery 1202 (e.g., short interval Bluetooth inquiry) and long interval device discovery 1204 (e.g., long interval Bluetooth inquiry). Short interval device discovery 1202 may be utilized in order to measure the proximity of apparatuses (e.g., of apparatus 1200 during a touch inquiry) in instances when, for example, Bluetooth controller 910 cannot set an operational mode wherein an event is generated each time an apparatus is encountered during device discovery. As mentioned above, such instances may occur when the command is not understood, the requested functionality is not available in Bluetooth controller 910, or apparatus 900 is not in condition to enter the requested operational mode. A shorter interval may be utilized in this instance since apparatuses are only being reported once during each device discovery, and thus, multiple short interval inquiries 1202 may be employed so that multiple RSSI measurements may be obtained to determine whether encountered apparatuses are within touch range of apparatus 900 (e.g., their RSSI satisfies the predetermined response criteria).

On the other hand, if an operational mode may be set in Bluetooth controller 910 wherein events are generated each time an apparatus is encountered during device discovery, a long interval device discovery mode may then be utilized during touch device discovery. As disclosed in FIG. 12, long interval device discovery 1204 may operate in a manner similar to the many individual short interval device discoveries 1202 in that in both situations multiple events may be generated based on each time apparatus 1200 is found, however, the speed at which these events are generated, and thus the overall number of generated events, may be substantially higher in a single long interval device discovery 1204 as compared to multiple short interval device discoveries 1202. The speed increase realized from using long interval device discovery 1204 may result because, in practice, short interval device discovery 1202 may not be set at much shorter than a five (5) second interval in order to accommodate event reporting for multiple apparatuses that may be in communication range of apparatus 900. The increased speed delivered by long interval device discovery 1204 may therefore increase touch inquiry performance in that the determination of whether apparatuses are in touch range may occur much faster, and thus, the overall apparatus selection and connection establishment process may be greatly expedited.

VI. Example Wireless Communication Medium Prioritization

Further to the example embodiments of the present invention as disclosed above, the overall performance of touch inquiry that may be realized by requesting event generation for each time an apparatus is encountered may be further enhanced through management of wireless communications in the inquiring apparatus. Apparatuses employed in touch inquiry may be able to communicate using a variety of wireless connectivity methods. For example, in addition to Bluetooth most commonly WLAN radio is used in the same device. In many instances WLAN and Bluetooth radio may be integrated so that they utilize same physical resources (e.g., receiver chain or at least same antenna). This integration may cause challenges how to control Bluetooth and WLAN operations so that they do not interfere with each other. Packet Traffic Arbitration (PTA) in WLAN may act as a control mechanism to avoid this problem. PTA may receive per-transmission transmit requests from each wireless network stack (e.g., Bluetooth, WLAN, etc.) and may issue transmission-confirmation signals to these stacks indicating whether transmission may proceed. The wireless networks may exchange these discrete signals for every packet to be transmitted, and in this manner may manage the times during which the wireless communication mediums are allowed to be active.

Control mechanisms for multiple radios (e.g., multiradio) are currently employed in controlling WLAN and BT operation during actual data transfer phase or during voice link operation. Device discovery is supported such that finding apparatuses is guaranteed but the time it takes is not considered. In touch inquiry operation search time has significant meaning in terms of expediting connection establishment, user experience, etc., and thus, mechanisms to expedite performance should be considered. Device discovery-related operations are not well supported by existing PTA solutions. Some apparatuses allow inquiries to proceed even when Bluetooth and WLAN are simultaneously active, however, in these instances the duration of the device discovery may be long and the resulting user experience when implementing touch inquiry is likely to be poor.

User experience when employing touch inquiry is improved by faster execution. Existing multiradio control mechanisms do not prioritize operations for wireless communication mediums used for touch inquiry (e.g., Bluetooth) over other wireless communication mediums that are active in an apparatus (e.g., WLAN). In accordance with at least one embodiment of the present invention, a multiradio control mechanism is envisioned that may prioritize (e.g., allocate a substantial amount of medium access time to) a relevant wireless communication medium (e.g., Bluetooth) when a touch inquiry is initiated, and then after the touch inquiry is complete (e.g., at least one apparatus has been selected) may renormalize the allocation of resources back to other wireless communication mediums that may also be active in the inquiring apparatus.

Now referring to FIG. 13A, an example configuration is disclosed for short-range wireless interfaces 156 that may be implemented in accordance with various embodiments of the present invention. While WLAN radio 1300 and Bluetooth radio 1304 are disclosed for the sake of explanation herein, the various embodiments of the present invention are not limited to use with only these wireless communication mediums. For example, two or more other wireless communication mediums having similar characteristics could replace Bluetooth and WLAN.

In FIG. 13A WLAN radio 1300 may comprise PTA control block 1302 that is configured to manage transmission/reception (Tx/Rx) scheduling between WLAN radio 1300 and Bluetooth radio 1304 via antenna switch 1306 and direct signaling to Bluetooth radio 1304. Direct signaling may allow Bluetooth radio 1304 to provide condition (e.g., high priority traffic indications) and time frame information to PTA control block 1302. PTA control block 1302 may utilize this information in order to allocate airtime for WLAN radio 1300 and Bluetooth radio 1304. Different levels of priority may be assigned to various wireless operations, wherein the highest priority level may allocate airtime to a particular wireless communication medium exclusively by configuring antenna switch 1306 to service only a particular radio (e.g., Bluetooth radio 1304). When a radio is being prioritized, PTA control block 1302 may continue to interact with other active radios in the apparatus (e.g., WLAN radio 1300) so that the "blackout" time (e.g., the time allocated exclusively to Bluetooth radio 1304) causes as little harm as possible. There may also be implementations where WLAN radio 1300 and Bluetooth radio 1304 have their own antenna chains. Even with separate antennas, PTA control block 1302 may manage Tx/Rx scheduling (e.g., through direct signaling to the radios) in order to avoid interference that may occur if both radios 1300 and 1304 attempt to transmit from the apparatus at the same time.

In accordance with various embodiments of the present invention, different radio prioritization schemes may be employed all with the end objective of enhancing touch inquiry performance. An example of a radio prioritization scheme is disclosed in FIG. 13B. An activity flow is disclosed comprising both actual Bluetooth and WLAN activity along with permitted time periods during which activity is allowed. In the example disclosed in FIG. 13B Bluetooth radio 1304 may indicate a period of time 1306 when touch inquiry starts and stops. During time period 1306 WLAN may be disallowed, which avoids potential interference that could result when both radios are active. The prioritization operation may be executed, for example, using a vendor specific HCI command that, in simplest form, just indicates that Bluetooth operation needs to be prioritized. When touch inquiry is initiated this HCI command may be sent to the communication entity (e.g., Bluetooth controller in Bluetooth radio 1304) that indicates to PTA control block 1303 that there is high priority traffic to send via Bluetooth radio 1304. High priority status may override other priorities that were previously active in the apparatus. Once touch inquiry has concluded (e.g. at least one apparatus has been selected), another command (e.g., the same or another vendor specific HCI command) may be sent to Bluetooth radio 1304 which may set Bluetooth priority back to a default level. It may also be possible that this command is given only after possible connectivity with the selected apparatus is established.

Another possible manner in which touch inquiry-related prioritization may be implemented is that whenever Bluetooth is performing any device discovery it will be given high priority status, and thus, Bluetooth can operate without disturbance. With device discovery-only control whenever a Bluetooth device discovery in initiated Bluetooth radio 1304 may indicate to PTA control block 1302 that high priority traffic is about to be created in Bluetooth. PTA control block 1032 may then cause airtime to be allocated substantially for Bluetooth operation (e.g., and all other wireless communication-related operations to be reduced or discontinued). In performing this operation Bluetooth radio 1304 may use existing PTA signaling and to signal both the priority and duration according to device discovery length. Priority signaling may be built into Bluetooth radios as a standard feature or may be activated over the HCI interface in the form of a vendor specific command.

A third scheme for prioritizing operation of a wireless communication medium associated with touch inquiry (e.g., Bluetooth), in accordance with at least one embodiment of the present invention, may be prioritizing Bluetooth operation when touch inquiry-related event reporting is configured in a communication entity (e.g., when a command sent by a control entity is acknowledged by an event sent from the communication entity). For example, when a touch inquiry is initiated (e.g., some application starts activity that utilizes touch inquiry), Bluetooth may be prioritized via, for example, an HCI command that is sent to Bluetooth radio 1304. The HCI command may further trigger Bluetooth radio 1304 to signal PTA control block 1304 that Bluetooth requires high priority access (e.g., some or all wireless airtime may be allocated to Bluetooth while access for other wireless communication mediums is reduced or discontinued). When touch inquiry is complete (e.g., after at least one apparatus has been selected and possibly a connection has been established), Bluetooth priority may be reset to a default level. This may once again be set via the Bluetooth HCI interface, followed by the Bluetooth controller setting the priority level in Bluetooth radio 1304 to a default level. In the above disclosure it is assumed that the Bluetooth prioritization is done via signaling occurring via Bluetooth. It is however possible that this indication may be signaled directly to WLAN or via another PTA mechanism.

VII. Example Sensor-Based Touch Inquiry Control

Touch inquiry, described above in terms of various example implementations, may automate the establishment of wireless connections between an inquiring apparatus and certain other encountered apparatuses. The activation and control of touch inquiry has been discussed as being related to applications running on an apparatus or user configuration. For example, various applications running on an apparatus that require information from sources external to the apparatus may cause the apparatus to initiate touch inquiry in order to select proximate apparatuses. The apparatus performing touch inquiry may then expedite wireless connection establishment to one or more of the selected apparatuses in order to, for example, obtain the information required by the various applications running on the inquiring apparatus.

As discussed above, user configuration may also be employed in triggering touch inquiries. Currently such configuration may require an apparatus user activating touch inquiry through the manipulation of one or more menus in an apparatus. In accordance with at least one embodiment of the present invention, touch inquiry activation may be triggered through sensing information related to the disposition of an inquiring apparatus. For example, at least one sensor in the apparatus may be configured to sense physical properties related to the apparatus such as, but not limited to, motion, acceleration and proximity of the apparatus to an object (e.g., another apparatus). Moving the apparatus changes the disposition of the apparatus, and the at least one sensor may sense these changes. Sensed information may be used, in accordance with at least one embodiment of the present invention, to trigger various stages of the touch inquiry process.

Figure 14:
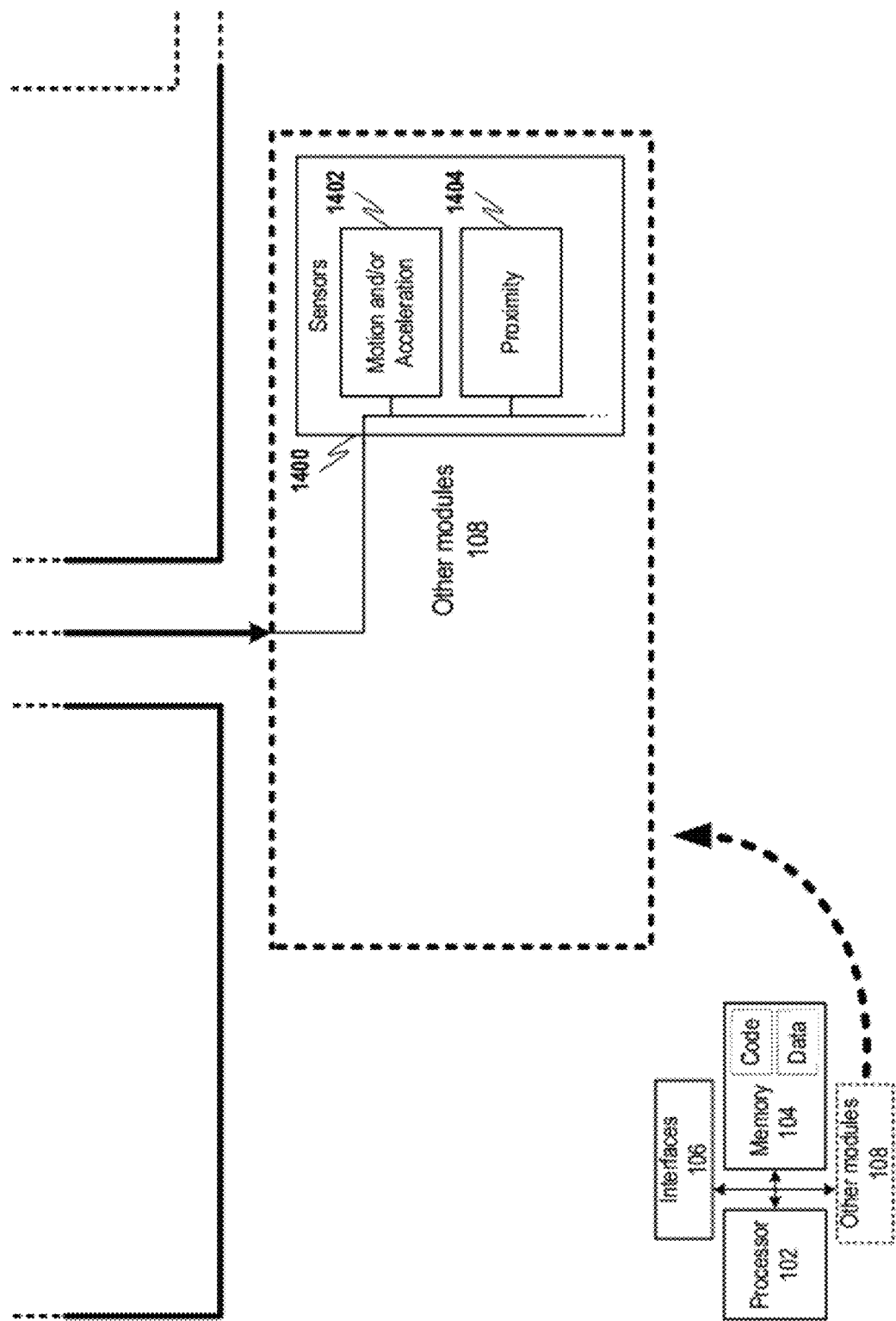
FIG. 14 discloses an example of other modules that may be comprised within an apparatus, the other modules including sensors in accordance with at least one embodiment of the present invention.

An example of at least one sensor that may be employed, in accordance with at least one embodiment of the present invention, is disclosed in FIG. 14. FIG. 14 expands upon the other modules 108 first shown in FIGS. 1A and 1B. For example, other modules 108 may include sensors 1400. Sensors 1400 may comprise one or more components including hardware and/or software that is configured to sense different parameters related to apparatus disposition. As disclosed in FIG. 14, sensors 1400 may comprise various different types of sensors including, but not limited to, motion and/or acceleration sensors 1402 and proximity sensors 1404. Motion and/or acceleration sensors 1402 may comprise one or more components that are configured to sense when apparatus 100 is moving in a particular direction, the speed that apparatus 100 is moving, when apparatus 100 is accelerating or decelerating, etc. Moreover, sensors 1404 may be configured to sense when the apparatus has changed direction (e.g., apparatus 100 is moving in a direction different from a previously sensed direction) and/or when the rate of acceleration or deceleration has changed for apparatus 100 (e.g., when apparatus 100 has stopped), etc.

Proximity sensors 1404 may comprise one or more components configured to detect when apparatus 100 has become proximate to (e.g., moved within a certain distance of) another object. The distance and types of objects that may be sensed by proximity sensors 1404 may depend on the technology being employed. For example, some proximity sensors 1404 may be more appropriate for detecting proximate electronic apparatuses based on sensing magnetic fields (e.g., hall-effect sensors), detecting nearby metallic objects (e.g., inductive sensors) or for detecting any proximate object based on receiving return signals that bounce off of the objects (e.g., infrared sensors), etc. While not shown in FIG. 14, sensors 1400 may also include other types of sensors such as internal/external temperature sensors, light/dark sensors, orientation sensors (e.g., electronic compass), altitude sensors, etc.

Figure 15A:
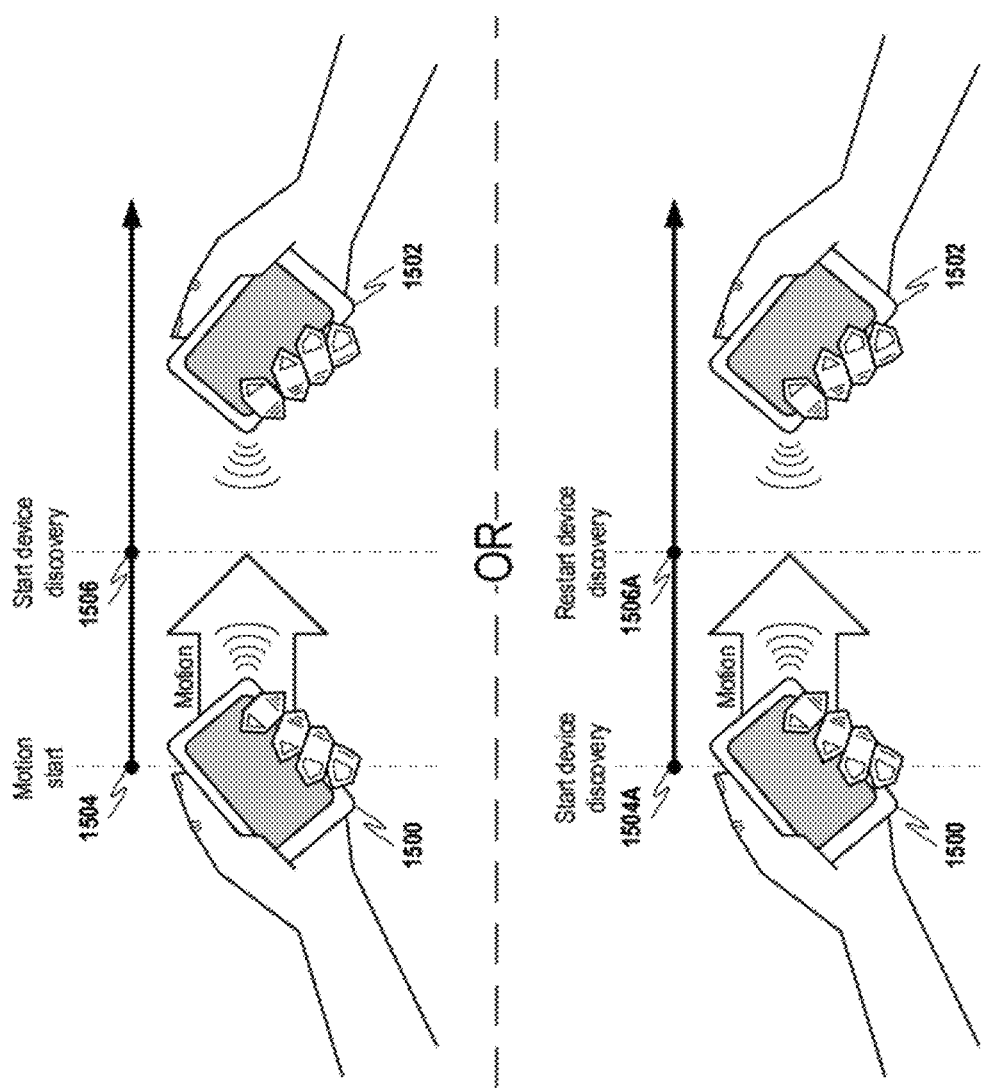
FIG. 15A discloses examples of motion-related activities that may create sensor input in an apparatus, the sensor input being usable for controlling touch inquiry in accordance with at least on embodiment of the present invention.
Figure 16:
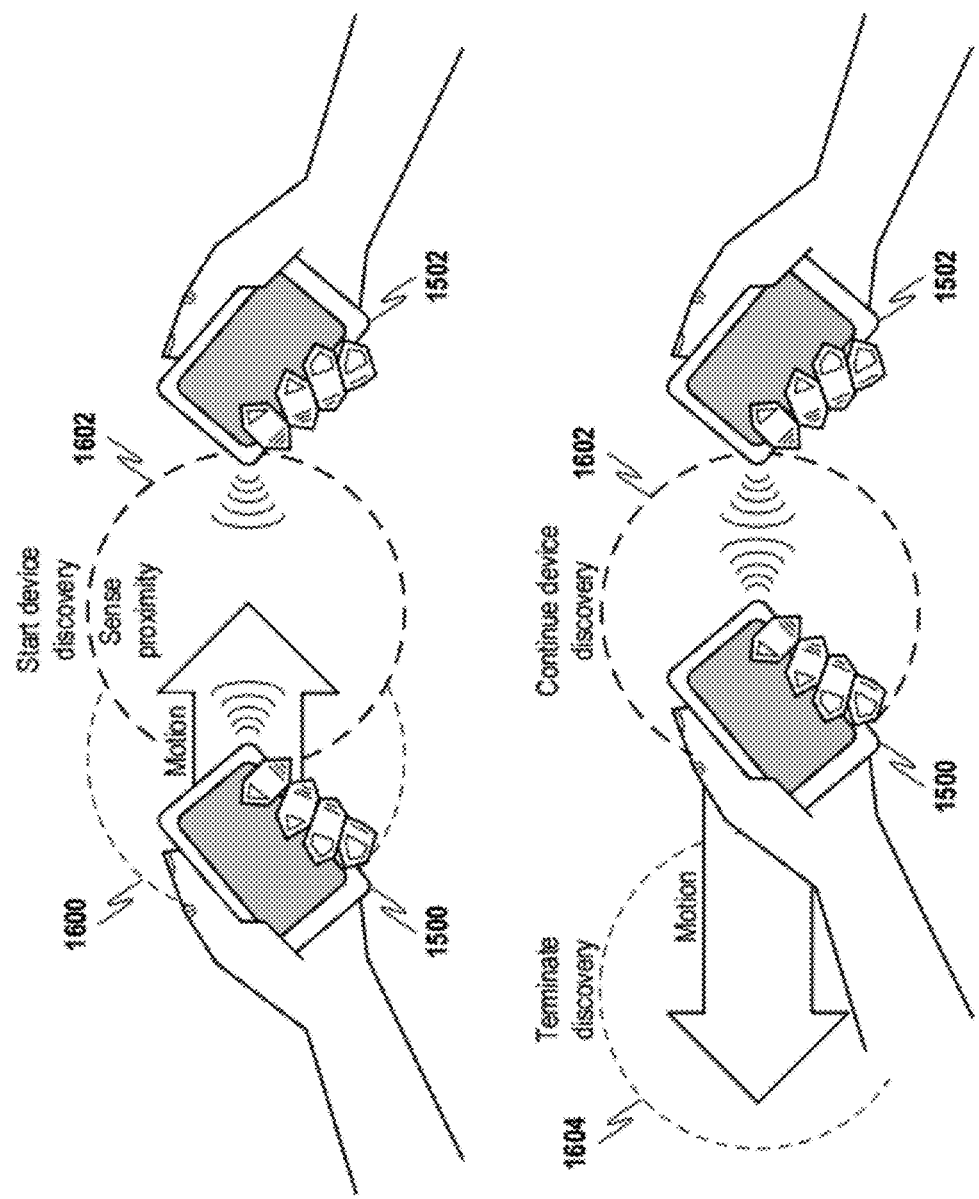
FIG. 16 discloses examples of proximity-related activities that may create sensor input in an apparatus, the sensor input being usable for controlling touch inquiry in accordance with at least on embodiment of the present invention.

Examples of how the sensors 1400 may be employed, in accordance with at least one embodiment of the present invention, is disclosed in FIGS. 15A, 15B and 16. For example, in FIG. 15A a sensor-based touch inquiry control mode may be triggered in an apparatus held by a user, as shown at 1500, wherein sensing various changes in apparatus disposition may trigger touch inquiry-related processes. This mode may be activated when the device is activated, when certain applications are invoked on the apparatus, by manual configuration, etc. While various example changes in disposition are disclosed they are merely for the sake of explanation herein, and are not intended to further limit the various disclosed embodiments of the present invention.

The examples disclosed in FIGS. 15A, 15B and 16 presume that establishment of a wireless connection between apparatuses 1500 and 1502 is desired. Two different examples of control based on sensed apparatus movement are disclosed in FIG. 15A. In in a first example of control pursuant to the establishment of the desired wireless connection, apparatus 1500 may be moved from position 1504 to position 1506 as shown in FIG. 15A. This motion may be sensed in apparatus 1500 (e.g., by motion and/or acceleration sensors 1402), and in response apparatus 1500 may initiate device discovery at 1506. In the alternative implementation also disclosed in FIG. 15A, apparatus 1500 may initiate discovery as soon as motion is sensed from point 1504A towards point 1506A. Upon arriving at point 1506A, apparatus 1500 may sense the change in apparatus disposition (e.g., that apparatus 1500 decelerated and/or came to a complete stop), and may alter the ongoing device discovery. For example, the sensed change in apparatus disposition may cause apparatus 1500 to restart device discovery (e.g., restart the interval by retransmitting discovery messages). Restarting device discovery may improve touch inquiry performance in some instances. For example, restarting device discovery at point 1506A (e.g., at a point when apparatus 1500 is presumed to be in close proximity to a desired target like apparatus 1502) may lead to faster target discovery and selection when using multiple short inquiry device discovery.

As previously disclosed above, in accordance with the various embodiments of the present invention, device discovery (e.g., Bluetooth inquiry) may comprise apparatus 1500 transmitting discovery (e.g., inquiry) messages and then receiving responses to the transmitted discovery messages, wherein at least some of these responses may include a particular type of response messages (e.g., such as extended inquiry response (EIR) messages). Apparatus 1500 may also measure signal strength (e.g., RSSI) for the particular type of response messages. In instances where apparatus 1500 cannot perform long interval device discovery as previously described in FIG. 12 at 1204, short interval device discoveries may be continually performed as previously described in FIG. 12 at 1202. The measurements made during device discovery may then be employed in device selection. For example, RSSI measurements corresponding to the particular response messages (e.g., EIR messages) received from the apparatuses encountered during device discovery may be compared to a predetermined response criteria (e.g., a minimum RSSI level) in order to determine if any of the encountered apparatus should be selected. If any of the encountered apparatuses are selected (e.g., is determined to correspond to received response messages that satisfy the predetermined response criteria), apparatus 1500 may proceed to expedite wireless connection establishment for the selected apparatus. Expediting wireless connection establishment may comprise apparatus 1500 automatically establishing a wireless connection to the selected apparatus (e.g., to apparatus 1502). If more than one apparatus is determined to satisfy the predetermined response criteria, it may be that an apparatus associated with the highest measured RSSI is selected, the first encountered apparatus that is associated with a measured RSSI determined to satisfy the predetermined response criteria is selected, etc.

Figure 15C:
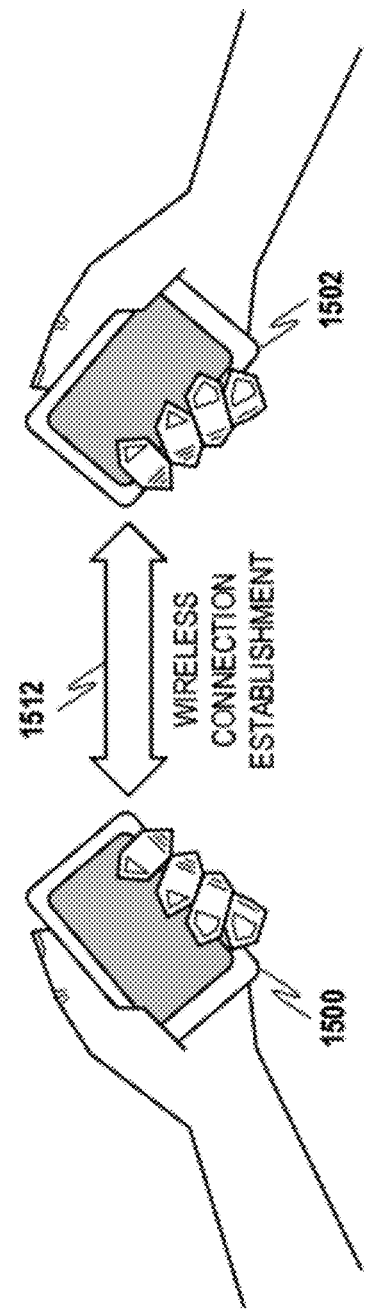
FIG. 15C discloses further examples of motion-related activities that may create sensor input in an apparatus, the sensor input being usable for controlling touch inquiry in accordance with at least on embodiment of the present invention.

FIG. 15B discloses further examples of sensor-based touch inquiry control. For example, device discovery and selection may continue at point 1508 until apparatus 1500 is moved to point 1510. The movement and/or acceleration may be sensed by sensors 1402 in apparatus 1500, and may trigger the apparatus to alter the ongoing device discovery. Altering the device discovery may comprise terminating device discovery as disclosed at point 1510 in order to, for example, save power in the apparatus after the desired apparatus has been selected (e.g., apparatus 1502). The process may then continue to FIG. 15C wherein, presumably after apparatus 1502 has been discovered and then selected by apparatus 1500, wireless connection establishment may proceed. Wireless connection establishment, in terms of FIG. 15C, may comprise apparatus 1500 automatically establishing a wireless connection to apparatus 1502.

FIG. 16 discloses an example similar to FIGS. 15A and 15B except implemented using proximity sensing. In FIG. 16 apparatus 1500 may be moved towards apparatus 1502, and in doing so the area within which apparatuses are sensed as being proximate to apparatus 1500 (e.g., as sensed by proximity sensors 1404) may move from 1600 to 1602. As proximity sensing area 1602 begins to encompass apparatus 1502, apparatus 1500 may start to detect the proximity of apparatus 1502. At this point device discovery may be activated in apparatus 1500, wherein the signal strength (e.g., RSSI) of signals (e.g. EIR messages) received from any encountered apparatuses (e.g., apparatus 1502) may be measured in apparatus 1500. Device discovery may continue while apparatus 1502 remains proximate to apparatus 1500. As disclosed in FIG. 12, and with respect to FIG. 15A, continuous device discovery may comprise repeated short interval device discoveries when long interval device discovery is unavailable. Apparatus 1500 may then be moved so that the location of apparatus 1502, as shown at 1602, is no longer within the area of proximity as sensed by apparatus 1500, as shown at 1604. This change in proximity may trigger apparatus 1500 to initiate a device selection mode wherein if any encountered apparatuses are selected (e.g., if any response messages corresponding to encountered apparatuses that were received by apparatus 1500 are determined to satisfy the predetermined response criteria), then apparatus 1500 may expedite wireless connection establishment to the selected apparatus (e.g., to apparatus 1502), such as previously shown at 1512 in FIG. 15B.

Figure 3:
FIG. 3 discloses an example user interface display indication in accordance with at least one embodiment of the present invention.

The above example process identifies a possible situation that may occur during touch inquiry, regardless of whether sensor-based control is being utilized. It is possible that situations may occur where none of the encountered apparatuses are selected. More specifically, it may be determined that none of the responses received from apparatuses encountered during device discovery satisfy the predetermined response criteria. In such an instance the inquiring apparatus may return to a more conventional operational mode such as disclosed in FIG. 3. For example, the apparatus may identify (e.g., may display identity information corresponding to) all of the encountered apparatuses so that the apparatus user may manually select the apparatuses to which a wireless connection should be established. For example, identity information may be displayed on the apparatus in a list such as shown in FIG. 3 at 302. The listing may be ordered by measured strength of signals received in the apparatus from each encountered apparatus.

A flowchart of an example process in accordance with at least one example of the present invention is disclosed in FIG. 17. The process may initiate in step 1700 wherein, for example, sensor-based touch inquiry control may be activated in the apparatus. Sensor-based touch inquiry control may be activated in a variety of ways including, but not limited to, when the apparatus is activated, when certain applications are activated on the apparatus, by manual configuration of the apparatus, etc. The sensors may then become active for sensor-based touch inquiry control in step 1702 in order to sense for changes in apparatus disposition. Changes in apparatus disposition may depend on the sensors being used, and may comprise, for example, sensing that the apparatus is moving in a first direction, sensing that the apparatus is accelerating or sensing that the apparatus has become proximate to an object. The sensing may continue until a determination is made in step 1704 that the disposition of the apparatus has changed. Device discovery may then be initiated in step 1706. In accordance with at least one embodiment of the present invention, device discovery (e.g., Bluetooth inquiry) may comprise the transmission of discovery messages to which other apparatuses may respond. The response messages received in the apparatus from encountered other apparatuses may comprise, for example, a particular type of response message (e.g., EIR message), wherein signal strength (e.g., RSSI) for the particular type of response message may be measured in the apparatus. A determination may then be made as to whether the particular type of response messages received in the apparatus from any of the encountered apparatuses satisfy a predetermined response criteria. The predetermined response criteria may comprise, for example, a minimum signal strength over which the particular type of response messages must be in order for a corresponding apparatus to be selected. An apparatus corresponding to a received message that satisfies the predetermined response criteria may then be selected by the apparatus.

In accordance with at least one embodiment of the present invention discovery may be controlled and possibly terminated in accordance with further sensor-based touch inquiry control such as set forth in optional steps 1708-1714. For example, discovery and selection may continue in step 1706 until a further change in apparatus disposition is sensed in optional step 1708. The process may then proceed to optional step 1710 wherein a further determination may be made as to whether the sensed change constitutes a termination condition wherein an ongoing device discovery and selection process should be terminated. A termination condition may be defined as, for example, based on at least one of a sensed motion or pattern of sensed motions recognized in the apparatus, the selection of at least one other apparatus, the selection of a group of apparatuses, satisfying an application requirement in the apparatus, a manual configuration in the apparatus, etc. If it is determined in optional step 1710 that a termination condition does not exist, then the process may proceed to optional step 1712 wherein device discovery and selection may be restarted. Restarting device discovery and selection may comprise, for example, transmitting new discovery messages and restarting the device discovery interval. The process may then return to optional step 1708 to continue device discovery and selection until another change in apparatus disposition is sensed. If it is determined in optional step 1710 that a termination condition does exist (e.g., based on the sensed change in apparatus disposition), the ongoing device discovery and selection may be terminated in step 1714.

The process may then move to step 1716 wherein a determination may be made as to whether an apparatus has been selected. If it is determined in step 1716 that an apparatus has been selected, the process may proceed to step 1718 wherein wireless connection establishment may be expedited with the selected apparatus. Expedited wireless connection establishment may comprise automatically establishing a wireless connection to the selected apparatus. The process may then be complete in step 1720 and may reinitiate in step 1700 when, for example, sensor-based touch inquiry control is reactivated in the apparatus. Alternatively, if is determined in step 1716 that no apparatuses were selected, then the process may proceed to step 1722 wherein identity information for apparatuses encountered during the discovery process may be displayed on the apparatus (e.g., so that an apparatus user may manually select the apparatuses to which wireless connections should be established. The identity information may be displayed, for example, in a list in order by the strength of signals received in the apparatus from each encountered apparatus. The process may then be complete in step 1720 and may reinitiate in step 1700 when, for example, sensor-based touch inquiry control is reactivated in the apparatus.

The various embodiments of the present invention are not limited only to the examples disclosed above, and may encompass other configurations or implementations.

For example, embodiments of the present invention may encompass an apparatus comprising means for sensing a first change in apparatus disposition, means for initiating device discovery based on the sensed first change, means for determining if another apparatus encountered during device discovery satisfies a predetermined response criteria, and means for, if it determined that the other apparatus encountered by the apparatus during discovery satisfies the predetermined selection criteria, selecting the other apparatus.

At least one other example embodiment of the present invention may include electronic signals that cause an apparatus to sense a first change in apparatus disposition, initiate device discovery based on the sensed first change, determine if another apparatus encountered during device discovery satisfies a predetermined response criteria, and if it determined that the other apparatus encountered by the apparatus during discovery satisfies the predetermined selection criteria, select the other apparatus.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    sensing a first change in apparatus disposition in an apparatus;
    initiating device discovery in the apparatus to detect wireless communication devices in response to the sensed first change;
    determining when any detected wireless communication devices satisfy a predetermined response criteria, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single wireless communication device; and
    when it is determined by the apparatus that the predetermined response criteria is satisfied, selecting a wireless communication device that satisfies the predetermined response criteria.

2. The method of claim 1, wherein sensing the first change comprises at least one of sensing that the apparatus is moving in a first direction, that the apparatus is accelerating, or that the apparatus has become proximate to an object.

3. The method of claim 1, wherein selecting the wireless communication device that satisfies the predetermined response criteria comprises expediting wireless connection establishment between the apparatus and the selected wireless communication device.

4. The method of claim 1, further comprising sensing at least one additional change in apparatus disposition in the apparatus; and
    altering the device discovery in the apparatus based on the at least one additional change.

5. The method of claim 4, wherein sensing the at least one additional change comprises at least one of sensing that the apparatus is moving in a direction different from an initial direction, that the apparatus is decelerating, that the apparatus has stopped, or that the apparatus is no longer proximate to an object.

6. The method of claim 4, wherein altering the device discovery comprises at least one of restarting the device discovery or terminating the device discovery.

7. The method of claim 1, further comprising if no wireless communication device satisfying the predetermined response criteria is detected, displaying identity information corresponding to any wireless communication devices encountered during device discovery on the apparatus.

8. The method of claim 7, wherein the identity information is displayed on the apparatus by listing the identity information for each of the wireless communication devices encountered by the apparatus in order by strength of signals received from each of the wireless communication devices.

9. The method of claim 1, wherein the predetermined signal strength level indicates that the apparatus and the wireless communication device are within touching range of one another.

10. The method of claim 1, wherein each of the plurality of response messages comprises an extended inquiry response having the measured signal strength at or above a predetermined signal strength level.

11. A computer program product, comprising computer executable program code recorded on a non-transitory computer readable storage medium, the computer executable program code comprising:
    code configured to cause an apparatus to sense a first change in apparatus disposition;
    code configured to cause the apparatus to initiate device discovery to detect wireless communication devices in response to the sensed first change;
    code configured to cause the apparatus to determine when any detected wireless communication devices satisfy a predetermined response criteria, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single wireless communication device; and
    code configured to cause the apparatus to, when it is determined by the apparatus that the predetermined response criteria is satisfied, select a wireless communication device that satisfies the predetermined response criteria.

12. The computer program product of claim 11, wherein the code configured to cause the apparatus to sense the first change comprises code configured to cause the apparatus to at least one of sense that the apparatus is moving in a first direction, that the apparatus is accelerating, or that the apparatus has become proximate to an object.

13. The computer program product of claim 11, wherein the code configured to cause the apparatus to select the wireless communication device that satisfies the predetermined response criteria comprises code configured to cause the apparatus to expedite wireless connection establishment between the apparatus and the selected wireless communication device.

14. The computer program product of claim 11, further comprising code configured to cause the apparatus to sense at least one additional change in apparatus disposition; and
code configured to cause the apparatus to alter the device discovery based on the at least one additional change.

15. The computer program product of claim 14, wherein the code configured to cause the apparatus to sense the at least one additional change comprises code configured to cause the apparatus to at least one of sense that the apparatus is moving in a direction different from an initial direction, that the apparatus is decelerating, that the apparatus has stopped, or that the apparatus is no longer proximate to an object.

16. The computer program product of claim 14, wherein the code configured to cause the apparatus to alter the device discovery comprises code configured to cause the apparatus to at least one of restart the device discovery or terminate the device discovery.

17. The computer program product of claim 11, further comprising code configured to cause the apparatus to, if no wireless communication device satisfying the predetermined response criteria is detected, display identity information corresponding to any wireless communication devices encountered during device discovery on the apparatus.

18. The computer program product of claim 17, wherein the identity information is displayed on the apparatus by listing the identity information for each of wireless communication devices encountered by the apparatus in order by strength of signals received from each of the wireless communication devices.

19. The computer program product of claim 11, wherein the predetermined signal strength level indicates that the apparatus and the wireless communication device are within touching range of one another.

20. The computer program product of claim 11, wherein each of the plurality of response messages comprises an extended inquiry response having the measured signal strength at or above a predetermined signal strength level.

21. An apparatus, comprising:
at least one processor; and
at least one memory including executable instructions, the at least one memory and the executable instructions being configured to, in cooperation with the at least one processor, cause the apparatus to perform at least the following:
sense a first change in apparatus disposition;
initiate device discovery to detect wireless communication devices in response to the sensed first change;
determining when any detected wireless communication devices satisfy a predetermined response criteria, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single wireless communication device; and
when it is determined by the apparatus that the predetermined response criteria is satisfied, selecting a wireless communication device that satisfies the predetermined response criteria.

22. The apparatus of claim 21, wherein the at least one memory and the executable instructions being configured to, in cooperation with the at least one processor, cause the apparatus to sense the first change comprises the at least one memory and the executable instructions being configured to, in cooperation with the at least one processor, cause the apparatus to at least one of sense that the apparatus is moving in a first direction, that the apparatus is accelerating, or that the apparatus has become proximate to an object.

23. The apparatus of claim 21, wherein the at least one memory and the executable instructions being configured to, in cooperation with the at least one processor, cause the apparatus to select the wireless communication device that satisfies the predetermined response criteria comprises the at least one memory and the executable instructions being configured to, in cooperation with the at least one processor, cause the apparatus to expedite wireless connection establishment between the apparatus and the selected wireless communication device.

24. The apparatus of claim 21, further comprising the at least one memory and the executable instructions being configured to, in cooperation with the at least one processor, cause the apparatus to sense at least one additional change in apparatus disposition; and
alter the device discovery based on the at least one additional change.

25. The apparatus of claim 24, wherein the at least one memory and the executable instructions being configured to, in cooperation with the at least one processor, cause the apparatus to sense the at least one additional change comprises the at least one memory and the executable instructions being configured to, in cooperation with the at least one processor, cause the apparatus to at least one of sense that the apparatus is moving in a direction different from an initial direction, that the apparatus is decelerating, that the apparatus has stopped, or that the apparatus is no longer proximate to an object.

26. The apparatus of claim 24, wherein the at least one memory and the executable instructions being configured to, in cooperation with the at least one processor, cause the apparatus to alter the device discovery comprises the at least one memory and the executable instructions being configured to, in cooperation with the at least one processor, cause the apparatus to at least one of restart the device discovery or terminate the device discovery.

27. The apparatus of claim 21, further comprising the at least one memory and the executable instructions being configured to, in cooperation with the at least one processor, cause the apparatus to, if no wireless communication device satisfying the predetermined response criteria is detected, display identity information corresponding to any wireless communication devices encountered during device discovery on the apparatus.

28. The apparatus of claim 27, wherein the identity information is displayed on the apparatus by listing the identity information for each of the wireless communication devices encountered by the apparatus in order by strength of signals received from each of the wireless communication devices.

29. The apparatus of claim 21, wherein the predetermined signal strength level indicates that the apparatus and the wireless communication device are within touching range of one another.

30. The apparatus of claim 21, wherein each of the plurality of response messages comprises an extended inquiry response having the measured signal strength at or above a predetermined signal strength level.

31. A system, comprising:
an apparatus; and
wireless communication devices;

the apparatus sensing a first change in apparatus disposition and initiating device discovery to detect wireless communication devices in response to the sensed first change; and the apparatus further determining when any detected wireless communication devices satisfy a predetermined response criteria, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single wireless communication device, and when it is determined by the apparatus that the predetermined response criteria is satisfied, selecting a wireless communication device that satisfies the predetermined response criteria.

32. The system of claim 31, wherein the predetermined signal strength level indicates that the apparatus and the wireless communication device are within touching range of one another.

33. The system of claim 31, wherein each of the plurality of response messages comprises an extended inquiry response having the measured signal strength at or above a predetermined signal strength level.

* * * * *